US010340516B2

(12) United States Patent
Put et al.

(10) Patent No.: US 10,340,516 B2
(45) Date of Patent: Jul. 2, 2019

(54) POSITIVELY CHARGED SILICON FOR LITHIUM-ION BATTERIES

(71) Applicant: Umicore, Brussels (BE)

(72) Inventors: Stijn Put, Olmen (BE); Jan Gilleir, Mortsel (BE); Kris Driesen, Hasselt (BE); Jean-Sébastien Bridel, Geel (BE); Nicolas Marx, Geel (BE); Delphine Longrie, Ghent (BE); Dan V. Goia, Potsdam, NY (US); John I. Njagi, Potsdam, NY (US)

(73) Assignee: UMICORE, Brussels (BE)

( * ) Notice: Subject to any disclaimer, the term of this patent is extended or adjusted under 35 U.S.C. 154(b) by 295 days.

(21) Appl. No.: 15/454,142

(22) Filed: Mar. 9, 2017

(65) Prior Publication Data

US 2017/0244101 A1 Aug. 24, 2017

Related U.S. Application Data

(63) Continuation of application No. 14/364,326, filed as application No. PCT/EP2012/075409 on Dec. 13, 2012, now abandoned.

(Continued)

(30) Foreign Application Priority Data

Apr. 19, 2012 (EP) .................................. 12164773
May 11, 2012 (EP) .................................. 12167592

(51) Int. Cl.
  *H01M 4/36* (2006.01)
  *H01M 4/38* (2006.01)
  (Continued)

(52) U.S. Cl.
  CPC ......... *H01M 4/366* (2013.01); *H01M 4/0404* (2013.01); *H01M 4/0416* (2013.01);
  (Continued)

(58) Field of Classification Search
  CPC ...... H01M 4/366; H01M 4/483; H01M 4/386; H01M 4/1395; H01M 4/134
  See application file for complete search history.

(56) References Cited

U.S. PATENT DOCUMENTS 7,951,489 B2 * 5/2011 Kim .................... H01M 4/0471
429/218.1
2003/0157407 A1 8/2003 Kosuzu
(Continued)

FOREIGN PATENT DOCUMENTS

JP 2006196338 A 7/2006
JP 2011049046 A 3/2011
(Continued)

OTHER PUBLICATIONS

Ahn, Dongjoon et al., "Thermodynamic measurements pertaining to the hysteretic intercalation of lithium in polymer-derived silicon oxycarbide", Journal of Power Sources, vol. 195 (2010), pp. 3900-3906.
(Continued)

*Primary Examiner* — Stewart A Fraser
(74) *Attorney, Agent, or Firm* — NK Patent Law

(57) ABSTRACT

This invention relates to a negative electrode material for lithium-ion batteries comprising silicon and having a chemically treated or coated surface influencing the zeta potential of the surface. The active material consists of particles or particles and wires comprising a core comprising silicon, wherein the particles have a positive zeta potential in an interval between pH 3.5 and 9.5, and preferably between pH 4 and 9.5. The core is either chemically treated with an amino-functional metal oxide, or the core is at least partly covered with $O_ySiH_x$ groups, with $1<x<3$, $1 \leq y \leq 3$, and $x>y$, or is covered by adsorbed inorganic nanoparticles or cationic multivalent metal ions or oxides.

20 Claims, 16 Drawing Sheets

Related U.S. Application Data

(60) Provisional application No. 61/570,375, filed on Dec. 14, 2011, provisional application No. 61/630,873, filed on Dec. 21, 2011.

(51) Int. Cl.
    *H01M 4/48*      (2010.01)
    *H01M 4/04*      (2006.01)
    *H01M 4/134*     (2010.01)
    *H01M 4/1395*    (2010.01)
    *H01M 4/62*      (2006.01)
    *H01M 10/0525*   (2010.01)
    *H01M 4/02*      (2006.01)

(52) U.S. Cl.
    CPC ....... *H01M 4/0428* (2013.01); *H01M 4/0471* (2013.01); *H01M 4/0492* (2013.01); *H01M 4/134* (2013.01); *H01M 4/1395* (2013.01); *H01M 4/38* (2013.01); *H01M 4/386* (2013.01); *H01M 4/483* (2013.01); *H01M 4/62* (2013.01); *H01M 10/0525* (2013.01); *H01M 4/622* (2013.01); *H01M 2004/027* (2013.01)

(56) References Cited

U.S. PATENT DOCUMENTS

| | | | |
|---|---|---|---|
| 2011/0086271 A1* | 4/2011 | Lee | H01M 4/134 429/220 |
| 2011/0097629 A1* | 4/2011 | Yew | H01M 4/134 429/231.8 |
| 2011/0136017 A1 | 6/2011 | Singh et al. | |
| 2011/0292570 A1* | 12/2011 | Ivanovici | B82Y 30/00 361/502 |
| 2012/0077082 A1 | 3/2012 | Se-Hee et al. | |

FOREIGN PATENT DOCUMENTS

| | | |
|---|---|---|
| TW | 201206826 | 2/2012 |
| WO | 2012000854 | 1/2012 |

OTHER PUBLICATIONS

Kim, Haegyeom, et al., "SnO2/Graphene composite with high lithium storage capability for lithium rechargeable batteries", Nano Res., vol. 3, No. 11 (2010), pp. 813-821.

Mazouzi, D., et al. "Silicon composite electrode with high capacity and long cycle life", Electrochemical and Solid-State Letters, vol. 12, No. 11 (2009), pp. A215-A218.

International search report for PCT/EP2012/075409, dated Mar. 5, 2013.

Bund, et al., "Influence of bath composition and pH on the electrocodeposition of alumina nanoarticles and nickel", Surface Coatings and Technology, vol. 201 (2007), pp. 7092-7099.

Yu et al., "Alumina-coated patterned amorphous silicon as the anode for a lithium-ion battery with high coulombic efficiency", Advanced Materials, vol. 23, Issue 42 (Nov. 9, 2011), pp. 4936-4941.

* cited by examiner

US 10,340,516 B2

POSITIVELY CHARGED SILICON FOR LITHIUM-ION BATTERIES

This application is a continuation of U.S. application Ser. No. 14/364,326, filed Jun. 11, 2014, which is a National Stage application of International Application No. PCT/EP2012/075409, filed Dec. 13, 2012, which claims the benefit of U.S. Provisional Application No. 61/570,375, filed Dec. 14, 2011 and U.S. Provisional Application No. 61/630,873, filed Dec. 21, 2011. This application also claims priority under 35 U.S.C. § 119 to European Patent Application No. 12164773.9, filed Apr. 19, 2012 and European Patent Application No. 12167592.0, filed May 11, 2012.

TECHNICAL FIELD AND BACKGROUND

This invention relates to a negative electrode material for lithium-ion batteries comprising silicon and having a chemically treated or coated surface influencing the zeta potential of the surface.

The Li-ion technology has dominated the portable battery market and stands as a serious candidate for EVs and HEVs applications. Therefore for such large volume applications, besides the need for higher energy density and power rate electrodes, safety and cost issues must be overcome. To address this challenge, a wide variety of research directions enlisting different Li reactivity mechanisms (conversion, displacement and alloying reactions) as compared to the classical Li insertion mechanism have been explored with more or less success. Recent findings have definitively put nano-materials on the stage with fast implementations in commercial cells, both at the positive side with intercalation compounds (olivine LiFePO$_4$) and at the anode side with alloying reactions.

Experimental studies on the electrochemical alloying of elements with lithium started in the early 70's when Dey described the creation of Li alloys at room temperature with Sn, Pb, Al, Au . . . and pointed out they were similar to those prepared by metallurgical ways. In 1976, Li was found to electrochemically react with Si at high temperatures through the consecutive formation of $Li_{12}Si_7$, $Li_{14}Si_6$, $Li_{13}Si_4$ and $Li_{22}Si_5$ phases. Even if we are now aware that this electrochemical reaction is limited at room temperature to the $Li_{15}Si_4$ end-member both the corresponding gravimetric (3579 mAh/g) and volumetric (8330 mAh/cm$^3$) capacities are far ahead all the other Li-uptake reactions so far identified, regardless of their nature (intercalation, alloying, conversion), and self-justify the past, present and surely future focus on this system.

Therefore, an inherent drawback to electrodes based on alloys lies in their poor cycling life (e.g. rapid capacity fading) caused by the large volume swings upon subsequent charges/discharges, which results in an electrochemical grinding of the electrode, and hence its electric percolation loss, and in the mean time a huge electrolyte degradation on the particles surface. To avoid this issue the first optional solution was to use electrodes made of nanoparticles as the usual mechanisms of deformation and dislocation are not the same as the micro scale, with namely the small particles being capable of releasing strains without fracturing. Unfortunately, these nanoscale silicon powders rapidly oxidize when exposed to air and the surface of commercially available Si or Si made in-situ in a plasma process, as disclosed in WO2012-000858, is covered by (protonated) silanol groups SiOH. These surface silanol groups cause a non-optimal behavior of the silicon particles in the anode electrode during the life of the battery.

Other approaches to keep the electrode integrity are either 1) the preparation of metal thin-films, which provide the best electrical contact via their strong adherence to the substrate, hence enabling high quality electrical contact during cycling, or 2) the fabrication of (metal-carbon-binder) composite electrodes with the proper binder so that Si/C/Carboxy-methyl-cellulose (CMC) electrodes having attractive cycling properties are achieved, or 3) the elaboration via the pyrolysis of organic precursors of metal-carbon (Si/C, Sn/C) composites with the carbon acting as a volume buffer matrix.

Huge progress has been made since 10 years to improve the behaviour of the silicon based electrode by an improvement of the slurry preparation and the choice of a good binder. Nevertheless, the active material particles need to be further tuned to realize the next step of improvement, especially to provide a better capacity retention during cycling. If today, the anode capacity can be maintained with a lithium counter-electrode, the silicon based metal-based electrodes present generally a weak capacity retention with a cathode that contains a limited quantity of lithium. To avoid this issue, the silicon surface needs to be modified to limit the electrolyte degradation.

Different strategies can be used to modify and protect the silicon surface. But the new surface needs also to be chosen according to the reactivity of the electrolyte, since the material needs to increase the potential window of stability of the electrolyte, and hence decrease the electrolyte decomposition. In US2011/0292570 Si nanoparticles having a positive surface charge are coating with graphene. The positive charge is caused by modification of the surface of the nanoparticles by functional groups, which are preferably selected from amino groups and ammonium groups, such as $NR_2$ and $NR_3^+$, where R is selected from H, $C_1$-$C_6$-alkyl or -hydroxyalkyl.

The invention aims at disclosing new Si based particles used in the negative electrode of a rechargeable battery that are capable of providing a better capacity retention during cycling.

SUMMARY

Viewed from a first aspect, the invention can provide a negative electrode material for use in a lithium rechargeable battery, the material comprising a core comprising silicon, wherein the material has a positive zeta potential in an interval between pH 3.5 and 9.5, and preferably between pH 4 and 9.5. In certain embodiments the zeta potential is at least +10 mV, preferably at least +20 mV, in the pH interval 3.5-9.5 and even in the interval 4-9.5. The advantage of having a higher zeta potential is to improve the dispersion between carbon, active material and binder during the paste preparation in aqueous media. By zeta potential is naturally meant the potential measured in demineralized water. The core material may be nanometric (thus having at least one dimension below 100 nm), of submicron size, or micron-sized, and may comprise a mixture of nano-sized Si particles and nano-sized Si wires, wherein the average particle size of the Si particles is at least 5 times the average width of the Si wires, and preferably at least 10 times the average width of the Si wires, such as described in WO2012-000854. This negative electrode material for Li-ion secondary batteries offers considerable advantages in limiting the loss of capacity during cycling. In one embodiment, the material has a point of zero-charge at pH 4 or higher, preferably at pH 7 or higher.

In another embodiment, the core has an average particle size between 20 nm and 200 nm (the average particle diameter was calculated assuming nonporous spherical particles and a theoretical density of the individual materials. Without going through the entire derivation, the equation for calculating the average particle diameter in nanometers is 6000/(BET surface area in $m^2/g$)×(density in $g/cm^3$)) and consists either of
- pure silicon (at least metallurgical grade), or of
- a silicon monoxide powder, which consists of a mixture at nanometric scale of Si and $SiO_2$, the powder may be micrometric, or of
- silicon having a $SiO_x$ surface layer, with $0<x<2$, the surface layer having an average thickness between 0.5 nm and 10 nm, or of
- a homogeneous mixture of silicon and metal oxides, having the formula $SiO_x \cdot (M_aO_b)_y$, with $0<x<1$ and $0 \leq y<1$, wherein a and b are selected to provide electroneutrality, and wherein M is either one or more of Ca, Mg, Li, Al, and Zr, or of
- an alloy Si—X, wherein X is either one or more metals of the group consisting of Sn, Ti, Fe, Ni, Cu, Co and Al.

The pure silicon may be nanometric. In some embodiments the silicon may be coated with carbon. The silicon material may also be a Si powder having an average primary particle size between 20 nm and 200 nm, wherein the powder has a $SiO_x$ surface layer, with $0<x<2$, the surface layer having an average thickness between 0.5 nm and 10 nm, such as disclosed in WO2012-000858. The alloys mentioned above may comprise, besides Si, metals such as Sn, Ti, Ni, Fe, Cu, Co and Al, as are disclosed in US2010-0270497, WO2007-120347 or co-pending application PCT/EP2011/068828.

In one particular embodiment, the surface of the core carries $O_ySiH_x$ groups, with $1<x<3$, $1 \leq y \leq 3$, and $x>y$. The $O_ySiH_x$ groups could also be considered to be a mixture of silanol (SiOH) and $SiH_x$, with $1<x<3$. The presence of silanol groups and $SiH_x$ can be detected by
- $^1$H MAS NMR spectrometry which shows two distinct regions at around 1.7 ppm and around 4 ppm. The first corresponds to the Si—OH while the second is assigned to adsorbed water or $SiH_x$ groups.
- $^{29}$Si MAS/CPMG NMR spectrometry which shows a first band at −100 ppm, attributable to silicon atoms carrying single hydroxyl groups, being either isolated silanols or vicinal silanols for both silicon. Another band at −82 ppm is assigned to silicon which carries at least one hydrogen ($SiH_x$).
- DRIFT Infra-red spectrometry which reveals the presence of various crystal modes as well as a Si—O—Si mode at around 1100 $cm^{-1}$. The peaks around 3500 $cm^{-1}$ are attributed to hydroxylated silanol group. Between 2260 and 2110 $cm^{-1}$, different peaks can be assigned to OySiHx deformation modes.

In another embodiment, the surface of the core is at least partly covered by a coating consisting of inorganic nanoparticles. The surface being at least partly covered means that here too the surface of the core may further carry $O_ySiH_x$ groups, with $1<x<3$, $1 \leq y \leq 3$, and $x>y$. These inorganic nanoparticles may be either one of an aluminium compound (such as $Al_2O_3$), a zinc compound (such as zinc oxide) and an antimony compound (such as antimony oxide). In one embodiment, the nanoparticles in the coating consist of a precursor material susceptible of being converted to either one of aluminium, zinc and antimony by reduction. The nanoparticles may form a first coating layer on the core having a thickness of less than 10 nm. There may be provided a second coating layer located between the core and the first coating of nanoparticles, the second coating layer comprising either carbon or aluminium. Either one or both of the first and second coating layer may be electrochemically active. The embodiment where the surface of the core is at least partly covered by a coating consisting of inorganic nanoparticles can be combined with the embodiment where the surface of the core carries $O_ySiH_x$ groups, with $1<x<3$, $1 \leq y \leq 3$, and $x>y$.

In another particular embodiment, the surface of the core is at least partly covered by adsorbed cationic polymers having either one or more of primary, secondary and tertiary amine functional groups. The surface being at least partly covered means that here too the surface of the core may further carry $O_ySiH_x$ groups, with $1<x<3$, $1 \leq y \leq 3$, and $x>y$. In still another particular embodiment, the surface of the core is at least partly covered by adsorbed cationic multivalent metal ions. The surface being at least partly covered means that here too the surface of the core may further carry $O_ySiH_x$ groups, with $1<x<3$, $1 \leq y \leq 3$, and $x>y$. In one embodiment, the metal ions may be either one or more of the group consisting of Al-, Sb-, Fe-, Ti- and Zn-ions.

This embodiment can be combined with the embodiment where the surface of the core carries $O_ySiH_x$ groups, with $1<x<3$, $1 \leq y \leq 3$, and $x>y$. In a further particular embodiment, the surface of the core is at least partly covered by adsorbed nanoparticles of cationic multivalent metal oxides. The surface being at least partly covered means that here too the surface of the core may further carry $O_ySiH_x$ groups, with $1<x<3$, $1 \leq y \leq 3$, and $x>y$. In one embodiment, the metal oxides are either one or more of the group consisting of Al-oxide, Mg-oxide, Pb-oxide, Sb-oxide, Fe-oxide, Ti-oxide, Zn-oxide and In-hydroxide. In another further particular embodiment, the surface of the core is at least partly covered by silanol groups (—Si—O$^-$ groups) covalently bound to amino-functional metal compounds, wherein the metal is either one or more of the group consisting of Si, Al and Ti. The surface being at least partly covered means that here too the surface of the core may further carry $O_ySiH_x$ groups, with $1<x<3$, $1 \leq y \leq 3$, and $x>y$. In one embodiment, the amino-functional metal compound used to chemically treat the core surface may be an alkoxide.

Viewed from a second aspect, the invention can provide the use of the active material described before in a negative electrode further comprising either a water-soluble, or a N-methylpyrrolidone-soluble binder material. The negative electrode may further comprise graphite.

Viewed from a third aspect, the invention can provide a process for preparing a negative electrode material, comprising the steps of:
- providing a nanosized silicon material,
- dispersing the silicon material in water,
- providing a quantity of cationic multivalent metal ions in the dispersion,
- adjusting the pH of the dispersion to a value between 2 and 3.5, and preferably between 2 and 2.5, and thereafter
- adjusting the pH of the dispersion to a value between pH 3.5 and 4,
- determining the zeta potential of the dispersion, and, if the zeta potential is negative,
- further adjusting the pH of the dispersion to a value 0.5 above the previous pH value, and determining the zeta potential of the solution, and
- repeating the adjustment step until a positive zeta potential is measured. When the cationic multivalent ions are mixed into the dispersion, the silicon material is partly covered by adsorbed cationic multivalent metal ions, which are converted into a coating consisting of inorganic nanoparticles during the subsequent steps of pH adjustment.

The nanosized silicon material may be dispersed in a demineralised water at neutral pH. The step of adjusting the pH of the dispersion to a value between 2 and 3.5 may be performed by addition of HCl. If the pH is adjusted to a value lower than 2, there is a risk of dissolving Si in the acid solution. Both the step of adjusting the pH of the dispersion to a value between 3.5 and 4, and, if applicable, the steps of further adjusting the pH of the dispersion to a value 0.5 above the previous pH value, may be performed by addition of NaOH. The cationic multivalent metal ions may be present in the nanosized silicon material as (accidental) dopant, or can be added in the water used to make the dispersion.

The invention can also provide a process for preparing a negative electrode material, comprising the steps of:
providing a nanosized silicon material,
subjecting the silicon material to an atomic layer deposition process in a reaction chamber under a vacuum of at least 1 mbar and at a temperature between 50 and 500° C., making use of gaseous organo-aluminium, organo-zinc or organo-antimony stream and water vapour, until a layer with a thickness between 2 and 10 nm is formed. The vacuum may be at last $10^{-1}$ mbar, and the temperature may be between 150 and 250° C. to make the process more economical.

The invention can also provide a process embodiment for preparing a negative electrode material, comprising the steps of:
providing a nanosized silicon material, and dispersing the silicon material in water,
providing a quantity of cationic multivalent metal ions in the dispersion,
mixing the dispersion whereby the silicon material is at least partly covered by adsorbed cationic multivalent metal ions, and
drying the metal ion-silicon mixture. The nanosized silicon material may be dispersed in a demineralised water at neutral pH. The metal ions may be for example either one or more of the group consisting of Al-, Sb-, Fe-, Ti- and Zn-ions.

The drying step may comprise a heating step under vacuum at a temperature between 70 and 100° C. for at least 1 hr. This process may comprise the additional steps of redispersing the dry metal ion-silicon mixture in water, and acidifying the dispersion to a pH between 2 and 6. This way a higher value for the zeta potential is achieved. Both additional steps may be combined by redispersing in an acid solution at a pH between 2 and 6. This method embodiment can also be combined with the first named process in the third aspect of the invention.

The invention can also provide a process for preparing a negative electrode material, comprising the steps of:
providing a nanosized silicon material,
dispersing the silicon material in water comprising ammonium ions, the surface of the silicon material being covered with silanol groups,
providing an amino-functional metal oxide compound to the mixture,
agitating the mixture, whereby the silanol groups are covalently bound to the amino-functional metal compounds, and
drying the mixture. Ammonium ions are added to control the pH of the solution.

The solution may comprise ethanol to render the dissolution of the metal oxide compound easier. The drying step may comprise a heating step under vacuum at a temperature between 70 and 100° C. for at least 1 hr. It may be preceded by a washing step with ethanol. The metal in the metal oxide compound may be for example either one or more of the group consisting of Si, Al and Ti.

The invention can also provide a process for preparing a negative electrode material, comprising the steps of:
providing a nanosized silicon material,
dispersing the silicon material in water,
adding a quantity of nanoparticles of cationic multivalent metal oxides to the dispersion,
agitating the dispersion whereby the surface of the silicon material is at least partly covered by adsorbed nanoparticles of cationic multivalent metal oxides, and
drying the metal oxide-silicon mixture. The nanosized silicon material may be dispersed in a demineralised water at neutral pH. The metal oxides may be for example either one or more of the group consisting of Al-oxide, Mg-oxide, Pb-oxide, Sb-oxide, Fe-oxide, Ti-oxide, Zn-oxide and In-hydroxide. The drying step may comprise a heating step under vacuum at a temperature between 70 and 100° C. for at least 1 hr.

In the different process embodiments, the final product may have an open porous volume lower than 0.01 cc/g. In one process embodiment, the nanosized material in each of the processes above may consist of either particles or a mixture of particles and wires, wherein both the particles and the wires are nano-sized, and wherein the average particle size of the particles is at least 5 times the average width of the wires, and preferably at least 10 times the average width of the wires. In another process embodiment, the silicon material may consist of either of
pure silicon, or of
a silicon monoxide powder, which consists of a mixture at nanometric scale of Si and $SiO_2$, the powder may be micrometric, or of
silicon having a $SiO_x$ surface layer, with $0<x<2$, the surface layer having an average thickness between 0.5 nm and 10 nm, or of
a homogeneous mixture of silicon- and metal-oxides, having the formula $SiO_x.(M_aO_b)_y$, with $0<x<1$ and $0 \leq y<1$, wherein a and b are selected to provide electroneutrality, and wherein M is either one or more of Ca, Mg, Li, Al, and Zr, or of
an alloy Si—X, wherein X is either one or more metals of the group consisting of Sn, Ti, Fe, Ni, Cu, Co and Al.

Viewed from a fourth aspect, the invention can provide a process for preparing an electrode assembly for a rechargeable Li-ion battery comprising the negative electrode material described before, comprising the steps of:
dispersing the negative electrode material in an aqueous solution, thereby obtaining a first slurry,
adjusting the pH of the first slurry to a value in the interval where the zeta potential of the material is positive,
dissolving a CMC salt in water so as to obtain an aqueous solution of binder material,
adjusting the pH of the aqueous solution of binder material to a value in the interval where the zeta potential of the material is positive, preferably the pH value of the first slurry,
mixing the first slurry and the aqueous solution of binder material to obtain a second slurry,
dispersing conductive carbon in the second slurry,
spreading the second slurry on a current collector, preferably a copper foil, and curing the electrode assembly comprising the second slurry at a temperature between 105 and 175° C.

DETAILED DESCRIPTION

The goal of this invention is to propose a modified particle surface for a Si comprising particle, hereby maintaining the capacity throughout cycles by a good interaction with the binder, and decreasing the reactivity of the electrolyte with the surface. The proposed approach in the invention is to modify the particle surface and to create a positively charged surface that is a surface having a positive zeta potential, in parts of the range of pH 3.5 to 9.5.

Figure 1:
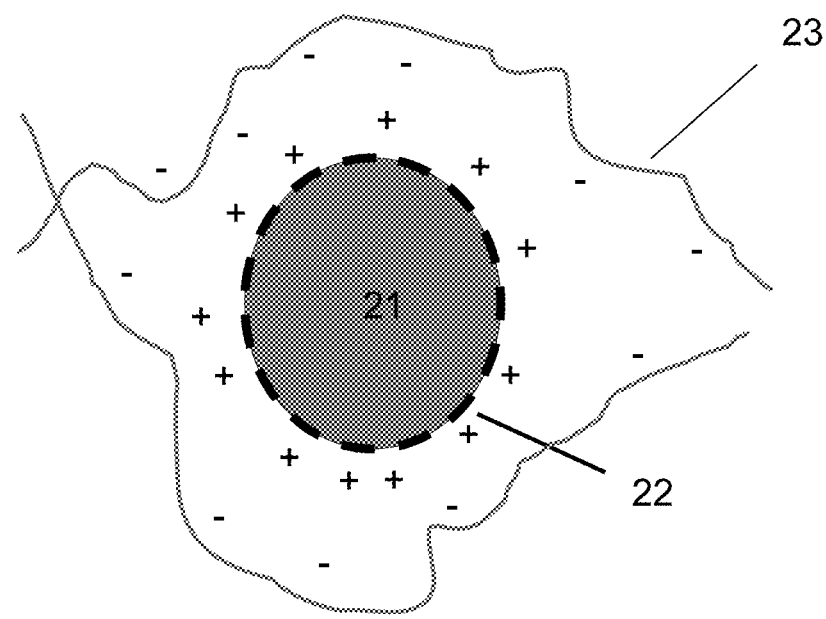
FIG. 1: schematic representation of a silicon particle (21) with a positively charged layer (22) surrounded by a negatively charged polymer (23)

Positively charged particles are characterised by dispersing 20 g/l of powder in distilled water. Zeta potentials 'Z' of the dispersion in the aqueous medium are measured by using for example a Zetaprobe Analyser™ from Colloidal Dynamics. Finally, a particle is defined as being a positively charged particle at a certain pH, if Z is higher than 0, and a negatively charged particle is defined as a particle having Z<0. This is illustrated in FIG. 1.

A silicon surface is natively negatively charged at neutral pH and can become positive between pH 2 and 3 (the isoelectric point or IEP of silica). The chemical surface groups are mainly deprotonated silanol groups. This charge is not in favour of a good interaction with the negatively charged binder. Indeed, the preferred binder is a water soluble polymer, like carboxylmethylcellulose binder (CMC) or polyacrylates PAA, which are negatively charged at neutral or even at lower pH.

We propose 4 different ways to modify the particle surfaces (see FIG. 2):

(A) with a at least partial coating of an inorganic layer (as for example coating of alumina, zinc oxide, or antimony oxide); by a deposition method of the layer; or whereby the particles are composed of a core comprising silicon, and an inorganic layer is attached to the core; where the coating is obtained with a chemical treatment consisting of a sequential acid—base treatment of the powder containing the elements of the future coating;

(B) with physical adsorption of cations (as for example cationic multivalent metal ions) or organic molecules to the core of the particles (as for example cationic molecules);

(C) with a chemical adsorption (creation of covalent bond) of organic molecules (as for example grafting of silane type molecule—or in general any amino-functional metal oxide—on the surface silanols);

(D) and with adsorption of nanoparticles (secondary particles) to the core of the particles (for example adsorption of nano particles of alumina at the surface of the silicon surface).

Figure 2:
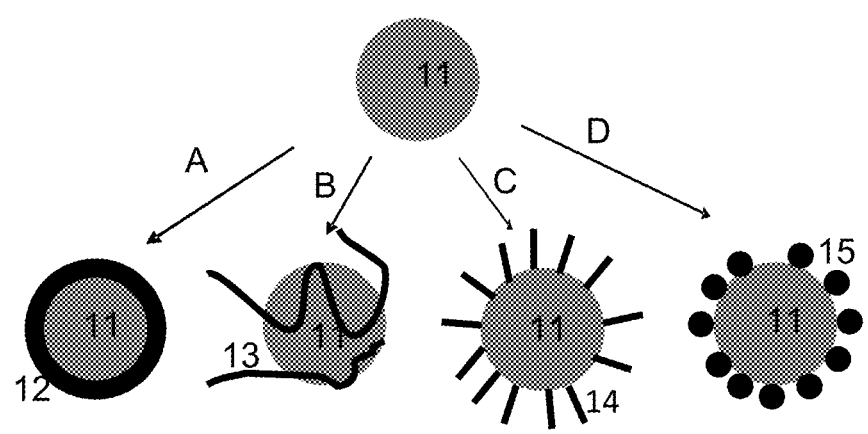
FIG. 2: scheme of the silicon particles (or primary particles) (11) with A: coating with inorganic layer (12); B: physically adsorbed organic molecules (13); C: chemically attached organic molecules (14) and D: adsorbed nanoparticles (secondary particles) (15) at the surface of the primary particles

Although FIG. 2 represents spherical particles, the particles may also consist of wires comprising silicon.

In case a coating is applied, this coating may be insulating, since the lithium can diffuse through the thin layer (organic or inorganic layer). Also, when applying a thin metal oxide coating, there is the additional advantage that the oxide can be converted in a metal and lithium oxide during the first cycle in the lithium-ion battery. This irreversible conversion will create a metallic surface which can, as the silicon, create alloys with the lithium and generate extra capacity and allowing a volumetric expansion; the proposed alumina/aluminium, zinc or antimony coating can grow with the volumetric expansion of the silicon and protect continuously the electrolyte/silicon contact.

This positively charged silicon or material comprising silicon is tested as an anode material in a lithium-ion battery. The powder is mixed with a binder and a carbon conductor to create a slurry that is coated on copper foil. The invention allows to improve the electrochemical behaviour of the silicon comprising particles by improving the dispersion of the silicon, carbon and polymer in the coating on the copper foil, improving the capacity retention and lowering the irreversibility.

Example 1: Alumina Coated Silicon

In this example, an alumina coating is applied by Atomic layer deposition (ALD), which is a deposition method to prepare nano-sized coatings. In the ALD process two (or more) alternating surface self-limiting chemical vapour deposition reactions are performed. The technology is also used to coat nano-powders. Small quantities of powder can be coated using a stationary system, but for larger quantities a fluidized particle bed reactor or a rotating reactor can be used, as illustrated in US 2011/0200822. A coating of $Al_2O_3$ can be deposited by thermal ALD using Tri-Methyl Aluminium (TMA) and $H_2O$ as reactants. The reaction temperature is around 200° C. The saturation of the reactive surface can be monitored using mass spectroscopy on the decomposition products of the precursors.

Figure 3:
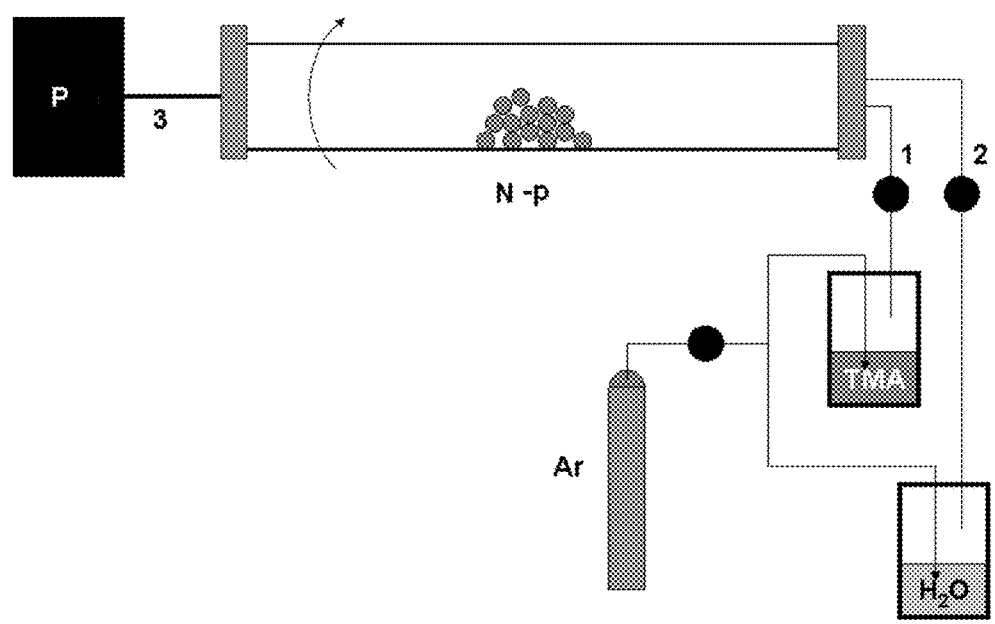
FIG. 3: scheme of the ALD reactor with P for pump, N-p for nanopowder and Ar for the Argon gas source.

In the Example, 5 g of a nanosilicon powder, made according to WO2012-000858, and having a BET of 21 $m^2/g$ with a open porous volume lower than 0.001 cc/g (measurement done by ASAP equipment by isotherm adsorption-desorption of $N_2$ at 77K after preheating the sample for 1 h under a flow of argon at 150° C.), an oxygen content <4 wt %, a primary particle size defined as 80 nm<D80<200 nm and an initial negative zetapotential (defined at pH7 in water) is weighed and put in a glass reactor (see FIG. 3). The reactor exit 3 is connected to a vacuum oil pump at $10^{-2}$ mbar. The reactor gas inlet 1 is connected to a trimethyl aluminium (TMA) supply (97%, Sigma-Aldrich) using Swagelok® tubes and an automated valve. The reactor gas inlet 2 is connected to a glass bottle of $H_2O$ (de-ionized) using Swagelok® tubes and an automated valve. During one "cycle" a gas flow of TMA and water is used. The valve connecting the reactor to TMA is opened until the surface is saturated with TMA (5 minutes) and closed. This is followed by opening the valve connecting the reactor to the $H_2O$ for 5 minutes. 6 cycles (TMA followed by water) are used for the preparation of the coating. An equal quantity of pristine nano-silicon powder is used as reference example.

Figure 4:
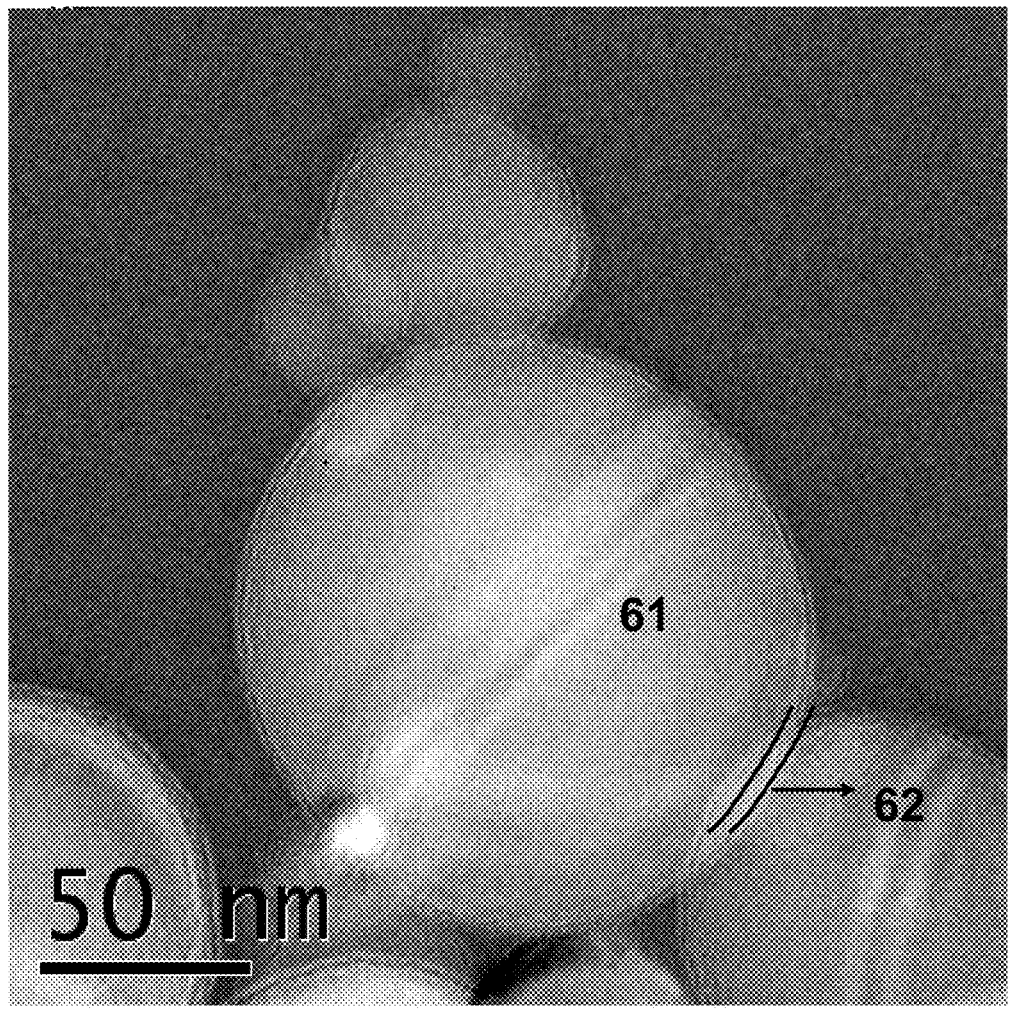
FIG. 4: TEM picture of silicon particles (61) with alumina coating (62)

The microscopic pictures show conformal homogeneous and thin (3 nm) coatings of alumina on the surface of silicon particles (see FIG. 4). The BET surface of this powder is determined at 20 $m^2/g$ (compared to 21 $m^2/g$ for the pristine silicon) and with a porous volume lower than 0.001 cc/g from the results of isotherm adsorption-desorption of $N_2$ at 77K after preheated for 1 h under a flow of argon at 150° C. The aluminium quantity is measured by ICP and a value of 2 wt % is calculated.

The ALD process thus comprises the steps of:
providing a nanosized silicon material in a reaction chamber under a vacuum of at least $10^{-1}$ mbar and at a temperature between 150 and 250° C.,
injecting a gaseous organo-aluminium, organo-zinc or organo-antimony compound in the reaction chamber,
saturating the surface of the silicon material with the organo-aluminium, organo-zinc or organo-antimony compound, and subsequently
injection water vapour in the reaction chamber, thereby providing the surface of the silicon material with a coating of aluminium-, zinc- or antimony oxide,
repeating the steps of injecting a gaseous organo-aluminium, organo-zinc or organo-antimony compound in the reaction chamber,
saturating the surface of the silicon material with the organo-aluminium, organo-zinc or organo-antimony compound, and subsequently
injecting water vapour in the reaction chamber, until a coating with a thickness between 2 and 10 nm is formed.

The measure of the zeta potential of the resulting material is made according to the following procedure: 150 ml of both a reference 2 wt % nano-silicon powder and the alumina coated silicon suspension in demineralised water is prepared by ultrasonification (120 s at 225 W). The zeta potential of this suspension in the aqueous medium is measured with the Zetaprobe Analyser™ from Colloidal Dynamics. The samples are automatically titrated from neutral pH to acid pH with 0.5 M HCl and to more basic pH with 0.5 M NaOH.

Figure 5:
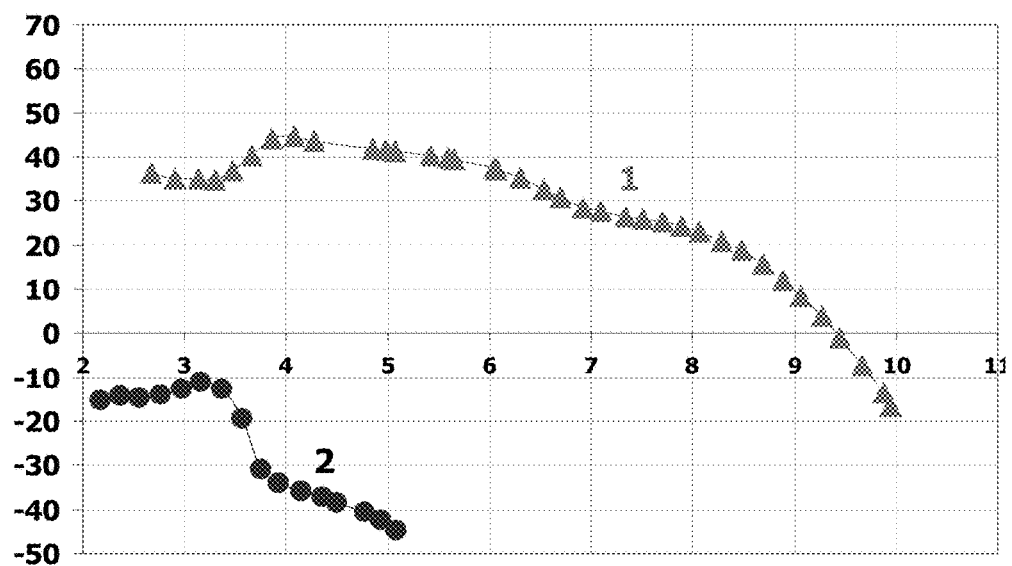
FIG. 5: Zeta potential (mV) versus pH of coated silicon (1) and comparison with pristine silicon (2).

The high negative surface charge on nano-silicon powder can be clearly measured (see FIG. 5, line 2). The zeta potential is negative from pH 5 to 2. In the case of the alumina coated silicon, the powder has a positive zeta potential from pH 9.5 to at least pH 2.5. (FIG. 5, line 1)

Figure 6:
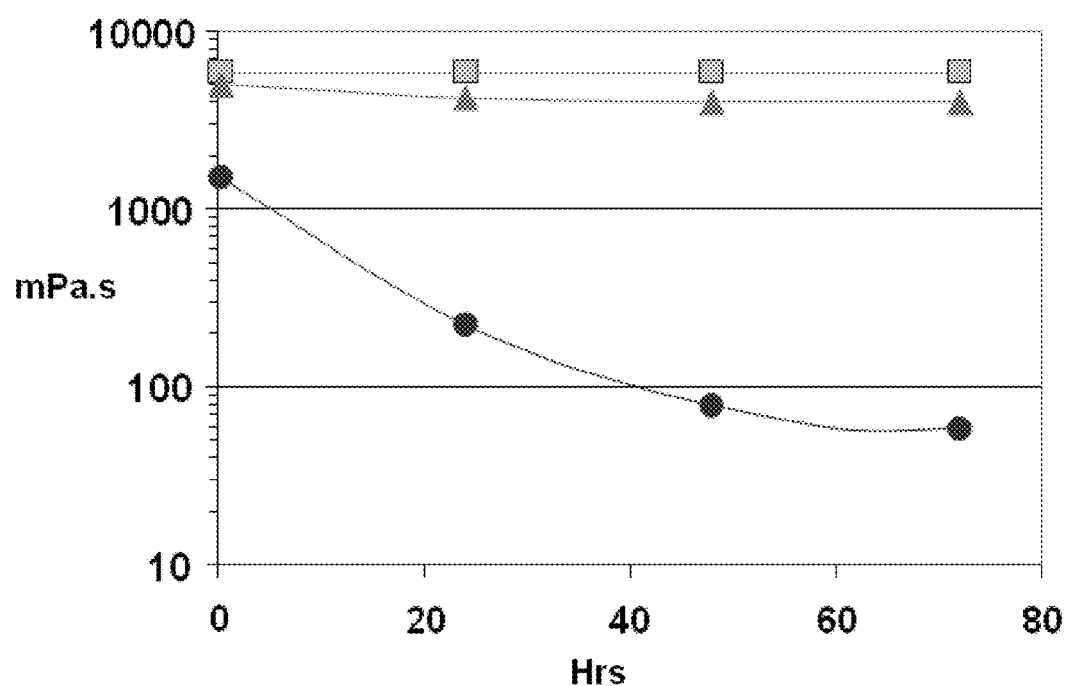
FIG. 6: Viscosity evolution according to time for silicon and coated silicon suspension in CMC solution, □=for CMC alone (blank test), ●=for pristine silicon (reference), Δ=for alumina coated silicon.

A slurry is prepared using 50 wt % of this powder (based on the dry residue), 25 wt % of a Na-CMC binder (Molecular weight <200 000) and 25 wt % of a conductive additive (Super C65, Timcal). In a first step, a 2.4% Na-CMC solution is prepared and dissolved overnight. Then, the conductive carbon is added to this solution and stirred for 20 minutes using a high-shear mixer. Once a good dispersion of the conductive carbon is obtained, the active material is added and the slurry is stirred again using a high-shear mixer during 30 minutes. One of the proofs that the coating prevents contact between the electrolyte and the silicon surface is the evolution of the viscosity of the CMC solution. Flow properties are measured under shear rate controlled conditions with the Fysica MCR300 rheometer with cone-plate measuring geometry at 23° C. When the polymer (CMC in this example) is in contact with the pristine silicon surface, we observe a drop of the viscosity of a CMC/Si solution/suspension. As shown in FIG. 6, the viscosity is maintained when the silicon is coated with alumina versus the blank test with CMC alone (□=for CMC alone, ●=for pristine silicon (reference), ∆=for alumina coated silicon), which proves that the silicon is fully covered with another material (here $Al_2O_3$).

Figure 7:
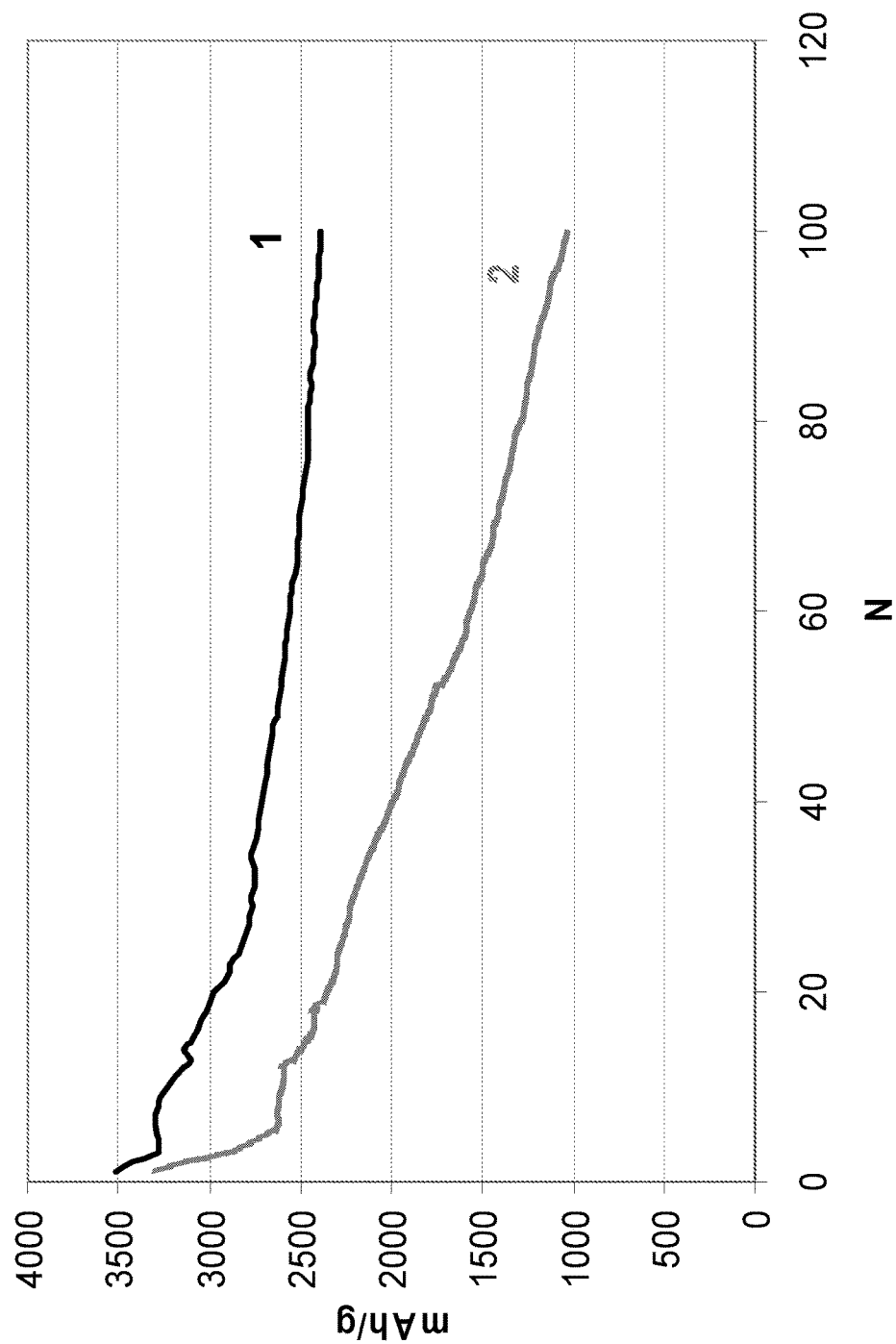
FIG. 7: Reversible delithiation capacity of a battery using coated silicon as anode material (1) and comparison with delithiation capacity of a battery using pristine silicon as anode material (2).

The electrodes are prepared by coating the resulting slurry on a copper foil (17 µm) using 125 µm wet thickness and then dried at 70° C. for 2 hours. Round electrodes are punched and dried at 150° C. during 3 hours in a small vacuum oven. The electrodes are electrochemically tested versus metallic lithium using coin cells prepared in a glove-box (dry Argon atmosphere). The electrolyte used is $LiPF_6$ 1M in a mix of EC/DEC (50/50 wt %)+10% FEC+2% VC (Semichem). The coin cells are tested in a CC mode between 10 mV and 1.5 V at a C-rate of C/5 (meaning a full charge or discharge of 3570 mAh/g of active material in 5 hours). The result is shown in FIG. 7.

We clearly see that the behaviour of the electrode is improved with the coating of alumina (line 1): after 100 cycles, the delivered capacity remains around 2400 mAh/g, versus 1000 mAh/g for the pristine silicon (line 2). It was found also that a coating that is thinner than 1 nm does not have the desired effect.

Counter-Example 1: Alumina Coated Silicon with High Thickness of Alumina

Figure 8:
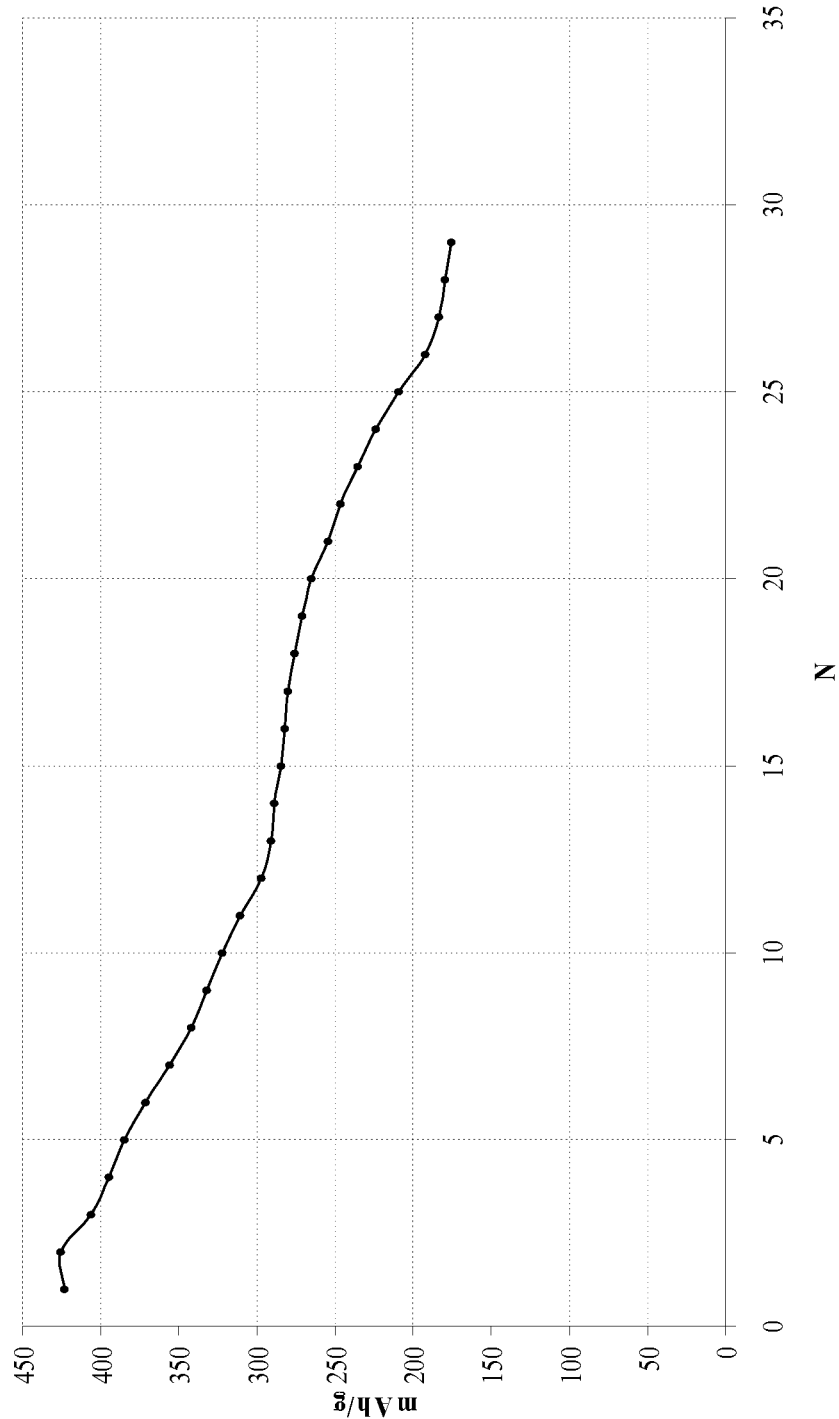
FIG. 8: Reversible delithiation capacity of a battery using alumina coated silicon (25 cycles of ALD) as anode material.

Alumina coated silicon is prepared with the ALD process as in the Example 1. 25 cycles (TMA followed by water) are used for the preparation of this powder (compared to 6 cycles in the Example 1). The alumina layer has a thickness of 12 nm. The BET of the surface decreases to 16 $m^2/g$ and the quantity of alumina is measured at 8 wt % of the powder. Slurries and batteries are prepared as in the Example 1, and the result is shown in the FIG. 8. The capacity is lower than 500 mAh/g from the first cycle, and this capacity drops in the following cycles. This result clearly shows the importance to have a thin layer at the surface of the silicon to allow the electrochemical reaction.

Example 2: Alumina Coated Silicon Particles and Nanowires

In this example, an alumina coating is applied by Atomic layer deposition (ALD) on Si particles and nanowires made according to WO2012-000854, and having an oxygen content <4 wt %. The synthesis procedure is described in the Example 1.

Figure 9:
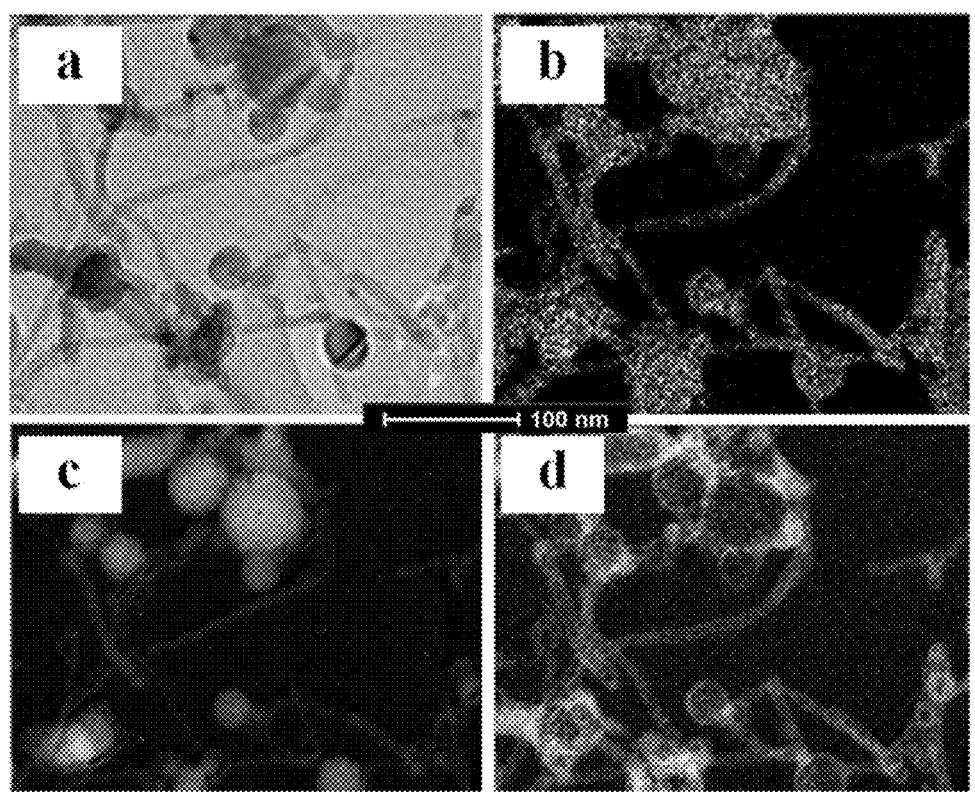
FIG. 9: TEM picture of silicon nanowires with alumina coating (a). EFTEM map of the samples with alumina contrast (b), silicon contrast (c) and oxygen contrast (d).

The microscopic pictures (see FIG. 9) show conformal homogeneous and thin coatings of alumina on the surface of the silicon particles. The coated powder is dispersed in ethanol, after which it is placed on a carbon grid mounted on the Cu support. The crushing step in the sample preparation was forgone, to avoid damaging the powder. EFTEM maps showing silicon, alumina and oxygen contrast are acquired at 300 kV using the Philips CM30-FEG microscope (see FIG. 9). The aluminium quantity is measured by ICP and a value of 2 wt % is calculated. As in the example 1, it is possible to prove that the silicon is fully covered with another material (here $Al_2O_3$) by measuring the viscosity evolution of a CMC-powder solution according to time.

The measure of the zeta potential is made according to the following procedure: 150 ml of both a reference 2 wt % powder and the alumina coated silicon nanowires suspension in demineralised water is prepared by ultrasonification (120 s at 225 W). The zeta potential of this suspension in the aqueous medium is measured with the Zetaprobe Analyser™ from Colloidal Dynamics. The samples are automatically titrated from neutral pH to acid pH with 0.5 M HCl and to more basic pH with 0.5 M NaOH.

Figure 10:
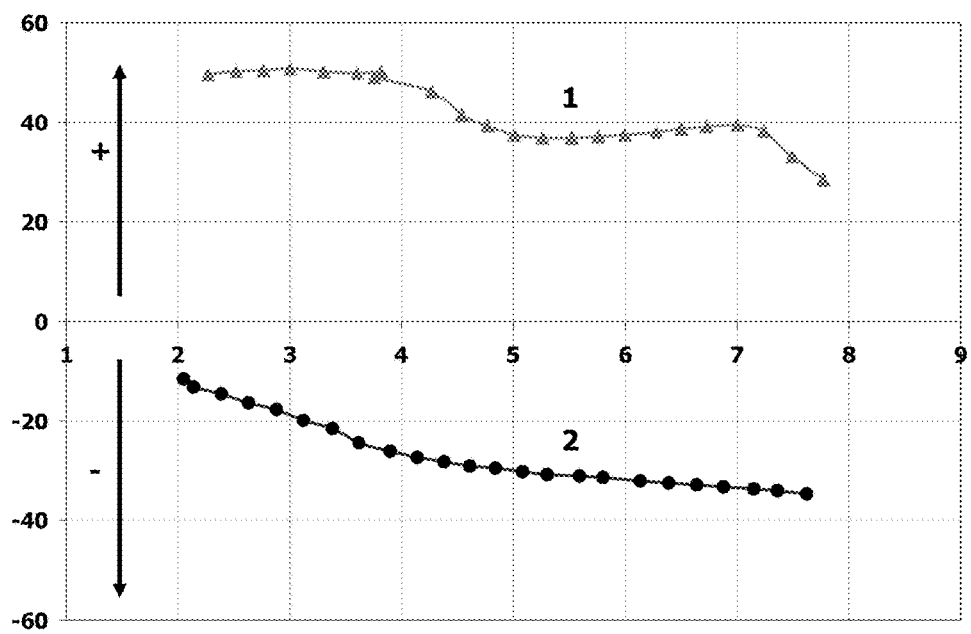
FIG. 10: Zeta potential (mV) according to pH of nanowires: coated nanowires (1) and comparison with pristine nanowires (2).

The high negative surface charge on nanowires can be clearly measured (see FIG. 10, line 2). The zeta potential is negative from pH 8 to 2. In the case of the alumina coated silicon nanowires, the powder has a huge positive zeta potential from pH 8 to at least pH 2. (FIG. 10, line 1)

Example 3: Acid—Base Treatment of Silicon Surface 150 ml of a 2 wt % nano-silicon suspension in demineralised water is prepared by ultrasonification (120 s at 225 W). The nano-silicon is made according to WO2012-000858 and has a BET of 25 $m^2/g$, an oxygen content <4 wt %, a particle size defined as 80 nm<D80<200 nm, an aluminium contamination of at least 0.1 wt % (typical for a plasma generated silicon powder), the contamination being concentrated at the particles' surface, and has an initial negative zetapotential (defined at pH7 in water. To the suspension, a known quantity of 0.5 M HCl is added to lower the pH to 2. Later, an addition of 0.5 M NaOH allows to bring back the pH of the suspension to pH 4. The zeta potential of this suspension in the aqueous medium is measured with the Zetaprobe Analyser™ from Colloidal Dynamics. The measured charge on these particles is positive as a zetapotential of +12 mV is measured.

Figure 11:
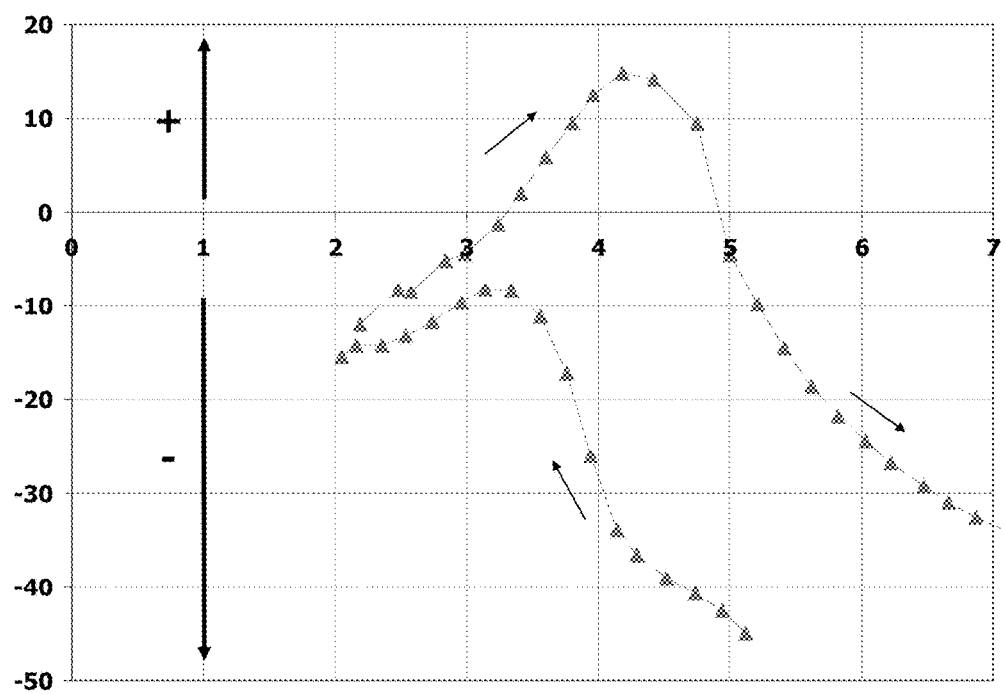
FIG. 11: Zeta potential (mV) according to pH of acid-base treated silicon

FIG. 11 describes the charge variation of the suspension during the acid-base treatment. The measure has been done with the Zetaprobe Analyser™ from Colloidal Dynamics and with solutions of 0.5 M HCl and 0.5 M NaOH. During the acid treatment, below pH 5, a steep decrease in surface charge is observed (translated by a decrease of the absolute value of zetapotential), most probably due to the protonation of silanol groups on the oxidized Si-surface and due to a dissolution of the aluminium compound contaminant which liberates aluminium ions. During the back titration (=the base treatment), the zeta potential becomes positive between pH 3.4 and pH 4.9. During the addition of base, a precipitation of alumina occurs at the surface of the electrode and thus creates the positive charge. The coverage is not total as the quantity of alumina is low, and this explain the behaviour of the surface which potential becomes negative for a pH higher than 5.

To prepare an electrode, the first step is the preparation of 2.4% Na-CMC solution by dissolving overnight, and then adjusting its pH to the pH of the silicon suspension prepared previously. The conductive carbon is added and the mixture is stirred for 20 minutes using a high-shear mixer. Once a good dispersion of the conductive carbon is obtained, the active material suspension (treated silicon) is added and the resulting slurry is stirred again using a high-shear mixer during 30 minutes. The slurry is prepared with a final composition of 50 wt % of this powder, 25 wt % of a Na-CMC binder (Molecular weight <200 000) and 25 wt % of a conductive additive (Super C65, Timcal).

Figure 12:
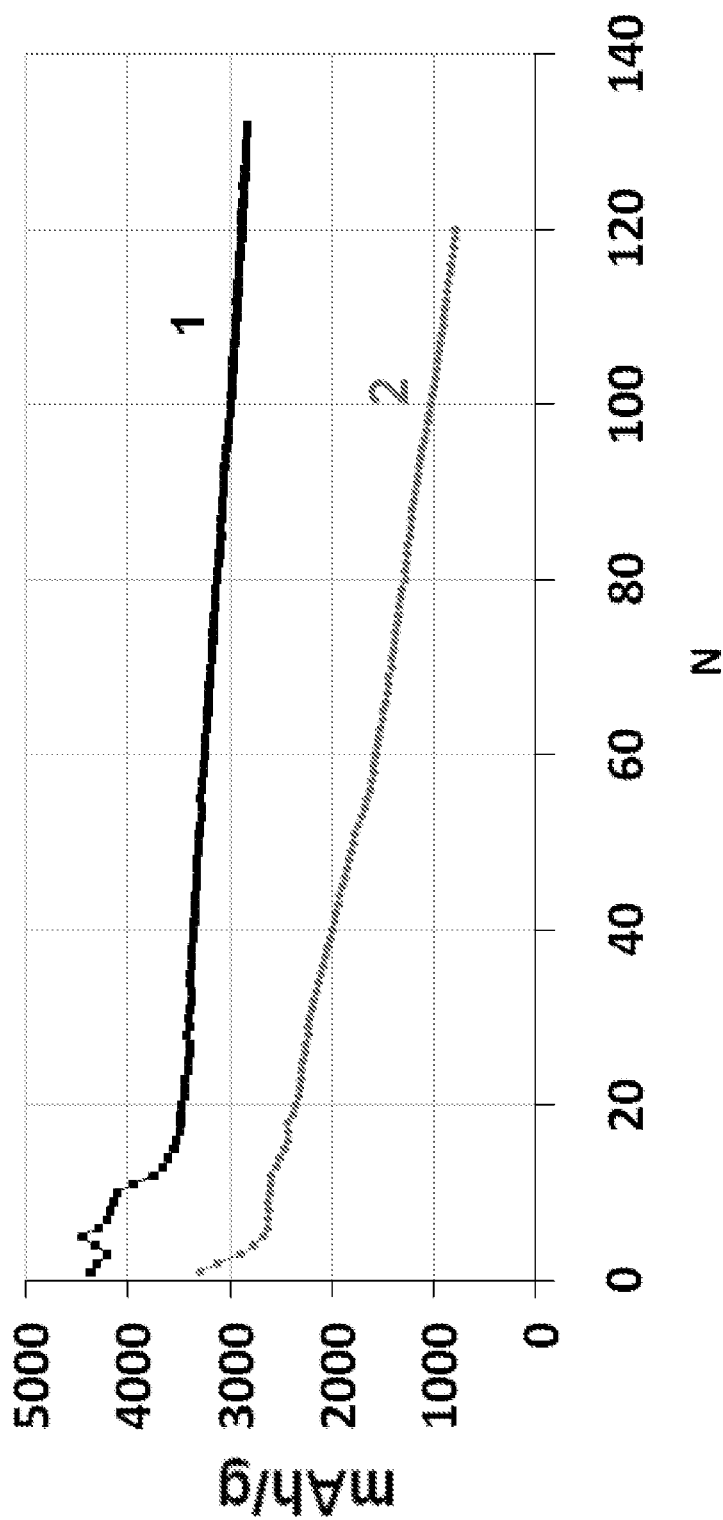
FIG. 12: Reversible delithiation capacity of a battery using treated silicon as anode material (1) and comparison with delithiation capacity of a battery using pristine silicon as anode material (2).

Electrodes are prepared by coating the resulting slurry on a copper foil (17 µm) using 125 µm wet thickness and are then dried at 70° C. for 2 hours. Round electrodes are punched and dried at 150° C. during 3 hours in a small vacuum oven. The electrodes are electrochemically tested versus metallic lithium using coin cells prepared in a glovebox (under dry Argon atmosphere). The electrolyte used is $LiPF_6$ 1M in a mix of EC/DEC (50/50 wt %)+10% FEC+2% VC (Semichem). The coin cells are tested in a CC mode between 10 mV and 1.5 V at a C-rate of C/5 (meaning a full charge of discharge or 3570 mAh/g of active material in 5 hours). The result is shown in FIG. 12, where the evolution of the capacity during cycling of the pristine nano-silicon powder (2) is compared to the evolution for alumina coated silicon (1).

We clearly see that the behaviour of the electrode is improved with the acid/base treatment in the presence of aluminium ions; after 100 cycles, the delivered capacity remains around 3000 mAh/g versus 1000 mAh/g for the pristine silicon.

Example 4: Silane Coated Silicon 12 g of nano silicon particles (made according to WO2012-000858) is dispersed in a 1000 $cm^3$ solution containing $NH_4OH$, $H_2O$ and $C_2H_5OH$ (pure ethanol) in the ratio 1:10:14 respectively. Ammonium hydroxide ($NH_4OH$, 30%) was supplied by J. T Baker. The suspension is sonicated for 20 minutes and further stirred overnight. Next, 6 g of APTS (a silicon alkoxide: 3-aminopropyltriethoxysilane) is added to the suspension, sonicated for 10 minutes and further stirred overnight. The APTS was purchased from Sigma Aldrich. The particles are allowed to settle, and mother liquid is removed. Next, the amine modified Si particles are washed three times with ethanol and then dried in a vacuum oven overnight at 60° C.

The effectiveness of surface modification is evaluated by the zeta potential (ZP), which was determined from the electrophoretic mobility measurements over a broad range of pH values. The surface zeta potential of this powder is investigated using ZetaPALS from Brookhaven Instruments. A dispersion containing 0.25 mg/cm$^3$ of modified silicon is prepared by dissolving the powder in 0.001 mol/L of KCl. To keep the ionic strength constant, the pH is adjusted using 0.1 mol/L of KOH and 0.1 mol/L HCl solutions. Different weight ratios of APTS:Si were tested to conclude that a ratio of at least 1:2 is recommended to obtain a positive charge in the particles surface.

Figure 13:
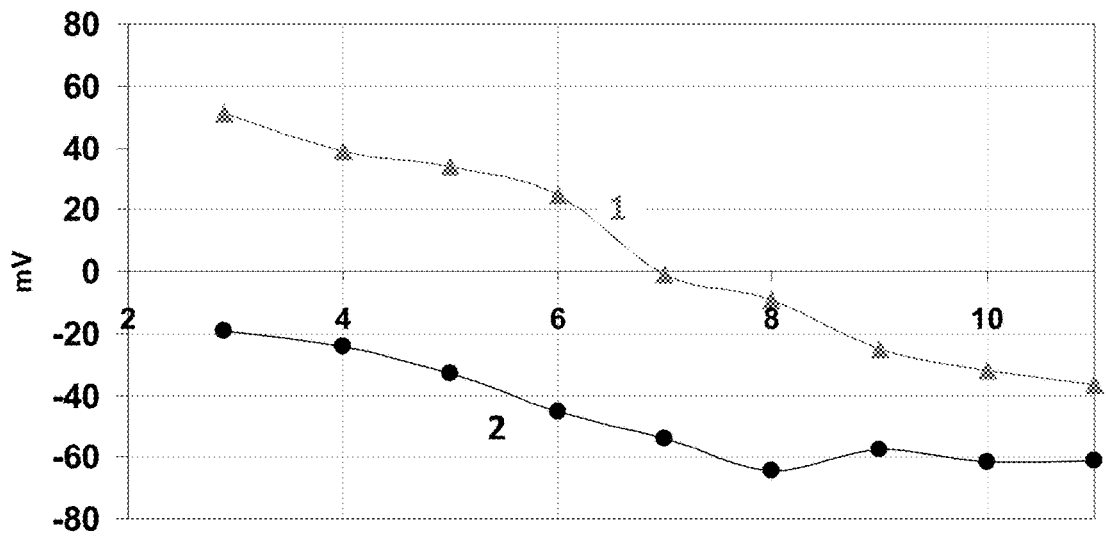
FIG. 13: Zeta potential (mV) versus pH of APTS (Si: APTS=4/5) coated silicon (1) and comparison with pristine silicon (2).

FIG. 13 shows the zetapotential of the amine modified— (with weight ratios of APTS:Si=5:4)(line 1) and pristine silicon (line 2) as a function of pH at a constant ionic strength. The success in surface modification is attested by the change in surface charge of the particles from negative to positive at pH values lower than 7, the amine treated particles having an iso-electric point at neutral pH. On the other hand, the pristine Si particles are negatively charged over the pH range of 3-11. All the silicon particles treated with APTS have a similar zetapotential profile if the weight ratios of APTS:Si is higher than 1:2).

APTS is one of the examples of cationic silane which can be used to create a positive charge. The same effect can be obtain with derivates of APTS (such as aminomethyltriethoxysilane, 2-aminoethyltriethoxysilane, aminotriethoxysilane, 3-aminopropyltrimethoxysilane), derivates of triethoxy(3-isocyanatopropyl)silane, or derivates of N-[3-(Trimethoxysilyl)propyl]aniline.

Example 5: Adsorption of Nano-Alumina Particles on Silicon Particles 100 ml of a 1 wt % nano-silicon (made according to WO2012-000858) suspension in demineralised water is prepared by ultrasonification (120 s at 225 W). To this suspension, a known quantity of 2 wt % of Al$_2$O$_3$ nanoparticles (commercially available: DISPARAL P2, Sasol; particles size <30 nm) dispersed in water is added in order to have a Al$_2$O$_3$/Si ratio of at least 2. In this example, 5 wt % of Al$_2$O$_3$ nanoparticles have been added. This combined dispersion is placed on a rollerbank for 30 minutes. Below a weight ratio alumina/silicon of 2/1, the agglomeration (silicon particles with alumina adsorbed particles) charge stays negative; indeed a minimum quantity of alumina particles is recommended to cover enough silicon surface and have a positive average charge of the agglomerations. The analysis of the porosity shows that some micro-porosity appear after the treatment (<0.01 cc/g). This is probably created between the nanoparticles of alumina.

After this mixing the pH of the solution is equal to 6 and the zeta potential of this suspension in the aqueous medium is measured with the Zetaprobe Analyser™ from Colloidal Dynamics. The measured charge on these particles is positive as a zetapotential of +45 mV is measured. This value shows that the alumina colloids were absorbed on the surface of silicon particles. The combined dispersion is then dried via a rotavap, heated to 80° C. under vacuum during 10 hours.

The measure of the zeta potential is made according to the following procedure: 100 ml of both a reference 1 wt % nano-silicon powder and the treated silicon powder suspension in demineralised water is prepared by ultrasonification (120 s at 225 W).

Figure 14:
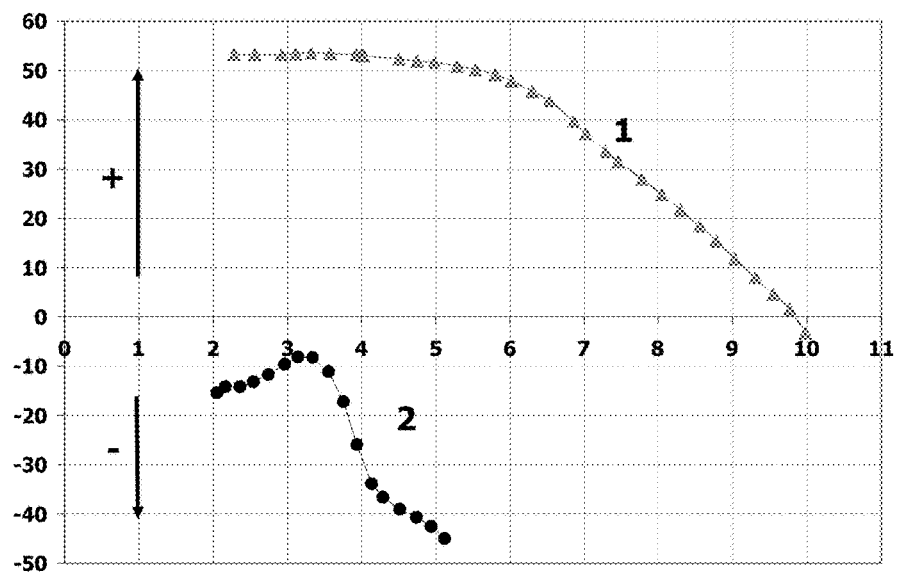
FIG. 14: Zeta potential (mV) versus pH of silicon carrying adsorbed alumina nanoparticles (1) and comparison with pristine silicon (2).

The zeta potentials of these suspensions in the aqueous medium are measured with the Zetaprobe Analyser™ from Colloidal Dynamics. The samples are automatically titrated from neutral pH to acid pH with 0.5 M HCl and to more basic pH with 0.5 M NaOH. The initial charge of the treated silicon is positive as the zeta potential is measured at 53 mV. Thus, this value shows that the adsorption of nanoparticles of alumina is kept during the drying process. The high negative surface charge on nano-silicon powder can be clearly measured (see FIG. 14, line 2). While the zeta potential is negative from pH 2 to at least pH 5 in the case of the pristine silicon, the treated silicon powder has a positive zeta potential from pH 9.5 to at least pH 2.5. (FIG. 14, line 1)

Figure 15:
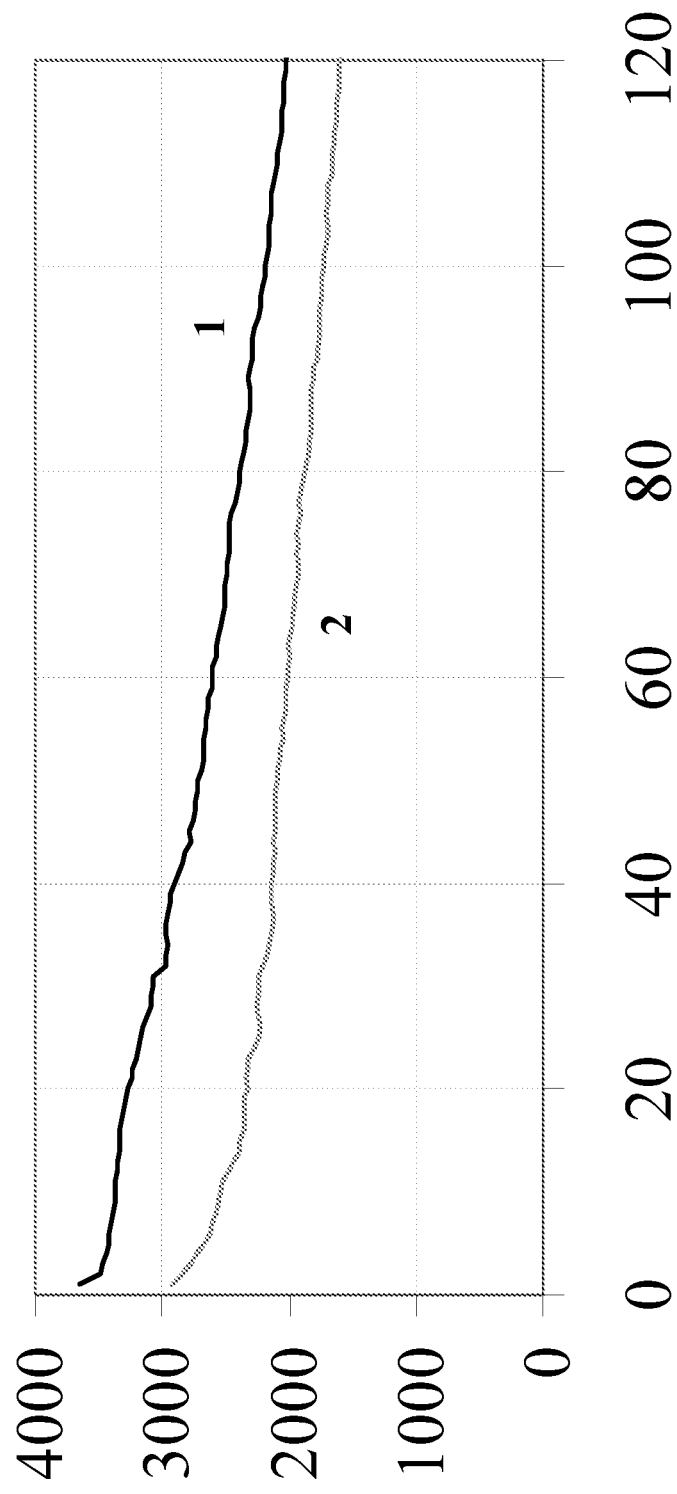
FIG. 15: Reversible delithiation capacity of a battery (mAh/g vs. cycle number) using alumina absorbed silicon as anode material (1) and reversible delithiation capacity of a battery using alumina treated silica absorbed silicon as anode material (2).

Slurries and batteries are prepared as in the Example 1, and the result of coin cell tests is shown in the FIG. 15. We clearly see that the behaviour of the electrode is improved with the adsorption of nano-alumina particles (line 1): the initial delivered capacity is similar to the theoretical capacity of the material and after 100 cycles, the delivered capacity remains around 2200 mAh/g, versus 1000 mAh/g for the pristine silicon (see FIG. 7 line 2).

Example 6: Adsorption of Cationic Polymer

For cationic polymer adsorption, a known dispersing agent is used: Poly ethylene-imine (PEI) whose chemical formula is (C$_2$H$_4$NH)n or

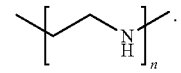

This polymer is a branched polymer containing primary, secondary and tertiary amine functional groups. The nitrogen can be protonated to make the polymer highly positively charged. It also presents the advantages to be soluble in water.

100 ml of a 1 wt % nano-silicon (made according to WO2012-000858) suspension in demineralised water is prepared by ultrasonification (120 s at 225 W). To this suspension, a quantity of 1 wt % PEI dispersed in water (PEI 10 kmol/g, pH adjusted to 6) is added. This combined dispersion is placed on a rollerbank for 30 minutes. After this mixing the zeta potential of the suspension in the aqueous medium is measured with the Zetaprobe Analyser™ from Colloidal Dynamics. The measured charge on the particles is positive as a zetapotential of +30 mV is measured. This value shows that the polymer chains are absorbed on the surface of silicon particles. To obtain the positive effect, a PEI/Si weight ratio of at least 0.35/1 is recommended or a mass of PEI of at least 14 mg per m$^2$ of silicon surface. This value shows that considerably less mass of PEI is necessary to obtain a positive charge than for nano-alumina in Example 5. The combined dispersion is then dried via a rotavap, heated to 80° C. under vacuum during 10 hours.

The measure of the zeta potential is made according to the following procedure: 100 ml of both a reference 1 wt % nano-silicon powder and the treated silicon powder suspension in demineralised water is prepared by ultrasonification (120 s at 225 W). The zeta potentials of these suspensions in the aqueous medium are measured with the Zetaprobe Analyser™ from Colloidal Dynamics. The samples are automatically titrated from neutral pH to acid pH with 0.5 M HCl and to more basic pH with 0.5 M NaOH. The initial charge of the treated silicon is positive as the zeta potential is measured at +35 mV. Thus, this value shows that the adsorption of PEI is kept during the drying process.

Figure 16:
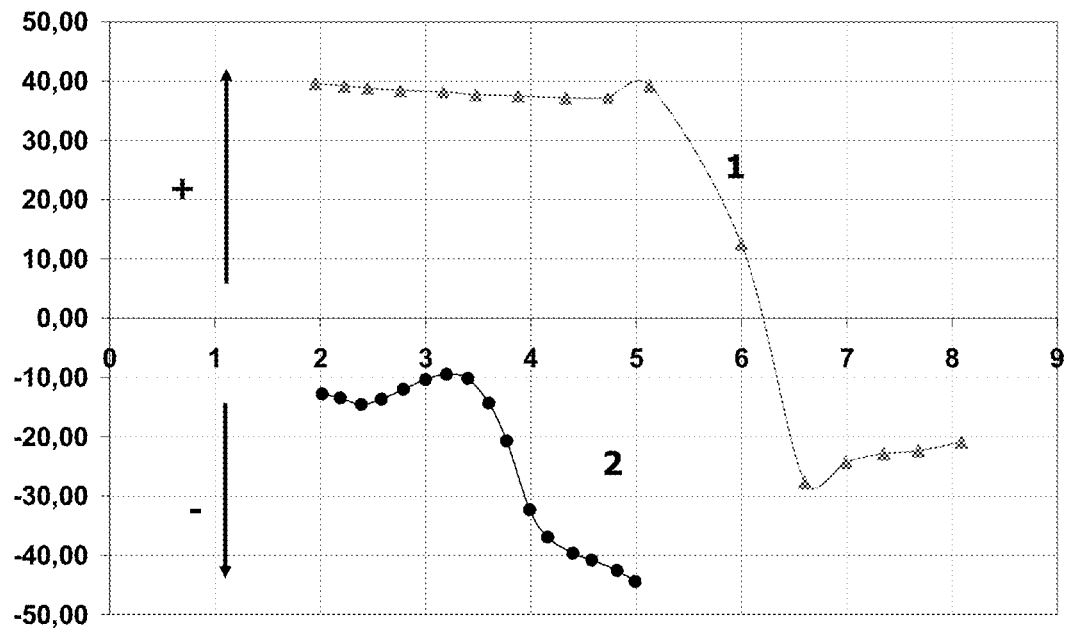
FIG. 16: Zeta potential (mV) versus pH of silicon carrying a physically adsorbed cationic polymer (1) and comparison with pristine silicon (2).

The high negative surface charge on nano-silicon powder can be clearly measured (see FIG. 16, line 2). Where the zeta potential is negative from pH 12 to 2 in the case of the pristine silicon, the treated silicon powder has a positive zeta potential from pH 6 to at least pH 2.5. (FIG. 16, line 1).

This effect can be also obtain by adsorption of others cationic surfactant and polymer based on pH-dependent primary, secondary, or tertiary amines as for example Octenidine dihydrochloride, Poly(4-vinylpyridine), Poly(2-vinylpyridine N-oxide), Poly(N-vinylpyrrolidone), . . . .

Slurries and batteries are prepared as in the Example 1. The adsorption of cationic polymer improves the capacity retention of the electrode: after 100 cycles, the delivered capacity remains above 1500 mAh/g, versus 1000 mAh/g for the pristine silicon (FIG. 7 line 2).

Example 7: Adsorption of Cation on Silicon Particles 100 ml of a 1 wt % nano-silicon (made according to WO2012-000858) suspension in demineralised water is prepared by ultrasonification (120 s at 225 W). To this suspension, at least 26 mg of $Al^{3+}$ (in a form of $AlCl_3$ salt) is added. This results in a Al/Si ratio of at least 0.026 or at least 1 mg of Al per $m^2$ of silicon. This combined dispersion is placed on a rollerbank for 30 minutes. The combined dispersion is then dried via a rotavap, heated to 80° C. under vacuum during 10 hours.

Figure 17:
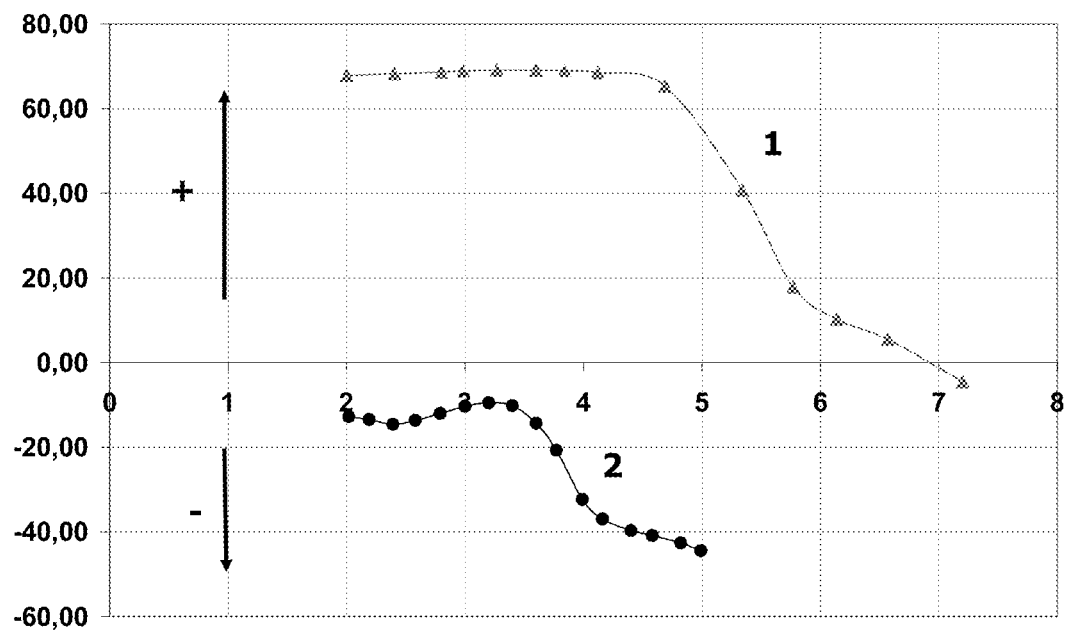
FIG. 17: Zeta potential (mV) versus pH of cation coated silicon (1) and comparison with pristine silicon (2).

The measure of the zeta potential is made according to the following procedure: 100 ml of both a reference 1 wt % nano-silicon powder and the treated silicon powder suspension in demineralised water is prepared by ultrasonification (120 s at 225 W). The zeta potentials of these suspensions in the aqueous medium are measured with the Zetaprobe Analyser™ from Colloidal Dynamics. The initial pH of this solution is 5.3 and the zetapotential is +40 mV. The sample is then automatically titrated from neutral pH to acid pH with 0.5 M HCl and to more basic pH with 0.5 M NaOH. The redispersed treated powder has a positive zetapotential from 2 to 7 (FIG. 17, line 1) with a stable value of +65 mV from 2 to 5. The zeta potential is negative from at least pH 5 to 2 in the case of the pristine silicon (FIG. 17, line 2).

Figure 18:
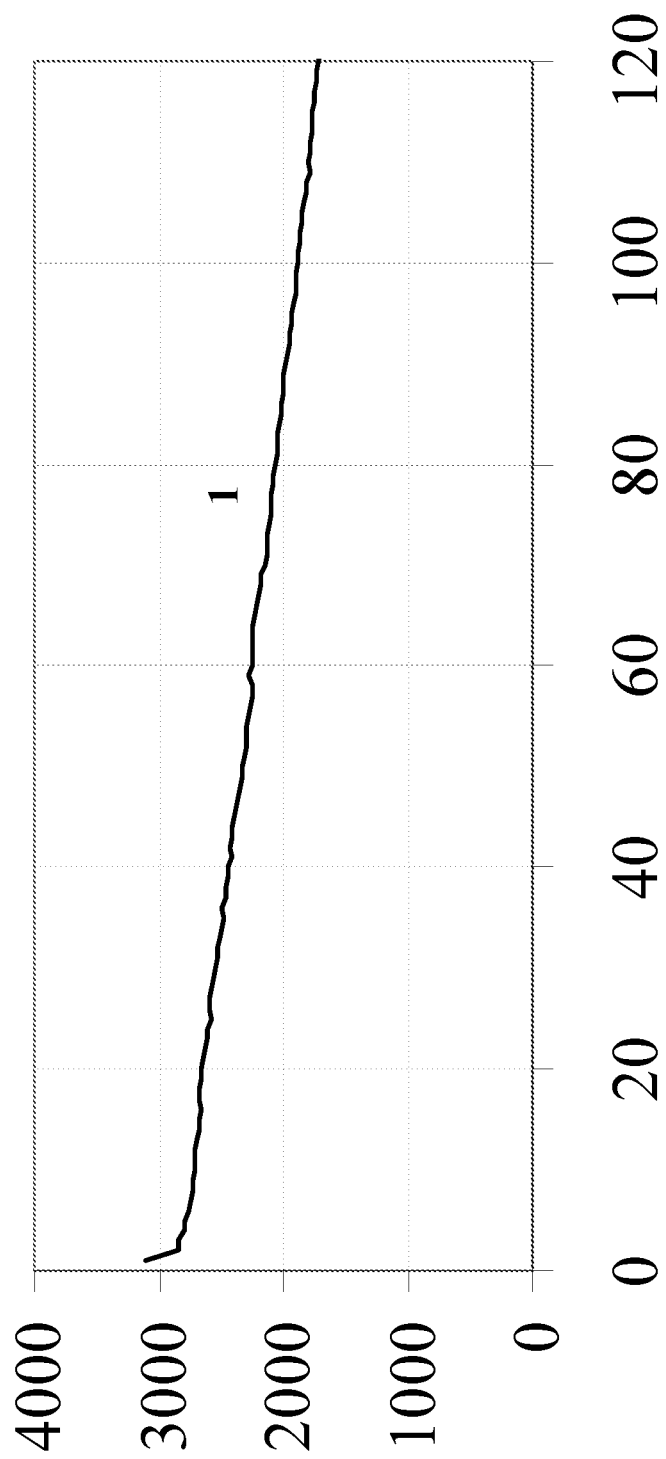
FIG. 18: Reversible delithiation capacity of a battery (mAh/g vs. cycle number) using cation coated silicon as anode material

Slurries and batteries are prepared as in the Example 1, and the result is shown in the FIG. 18 (capacity in mAh/g versus cycle number). We clearly see that the behaviour of the electrode is improved with the adsorption of cation (line 1): after 100 cycles, the delivered capacity remains around 1950 mAh/g, versus 1000 mAh/g for the pristine silicon (FIG. 7 line 2).

Besides $AlCl_3$, other water soluble aluminium salts or Sb, Ti and Zn (all cationic multivalent metals) can be used to obtain a similar result.

Example 8a: Alumina Coated Silicon: Variation of Specific Surface

In this Example, 5 g of a nanosilicon powder, made according to WO2012-000858, and having a BET of 40 $m^2/g$ with a open porous volume lower than 0.001 cc/g (measurement done by ASAP equipment by isotherm adsorption-desorption of $N_2$ at 77K after preheated for 1 h under a flow of argon at 150° C.), an oxygen content <4 wt %, and an initial negative zetapotential (defined at pH7 in water) are use and treated as in Example 1.

Microscopic pictures show conformal homogeneous and thin (3 nm) coatings of alumina on the surface of the silicon particles. The BET surface of this powder is determined at 40 $m^2/g$ (no modification of the BET after the ALD treatment) and with a porous volume lower than 0.001 cc/g from the results of isotherm adsorption-desorption of $N_2$ at 77K after preheated for 1 h under a flow of argon at 150° C. The aluminium quantity is measured by ICP and a value of 3.4 wt % is calculated. The measure of the zeta potential of the resulting material is made according to the following procedure: 150 ml of both a reference 2 wt % nano-silicon powder and the alumina coated silicon suspension in demineralised water is prepared by ultrasonification (120 s at 225 W).

The zeta potential of this suspension in the aqueous medium is measured with the Zetaprobe Analyser™ from Colloidal Dynamics. The samples are automatically titrated from neutral pH to acid pH with 0.5 M HCl and to more basic pH with 0.5 M NaOH.

Figure 19:
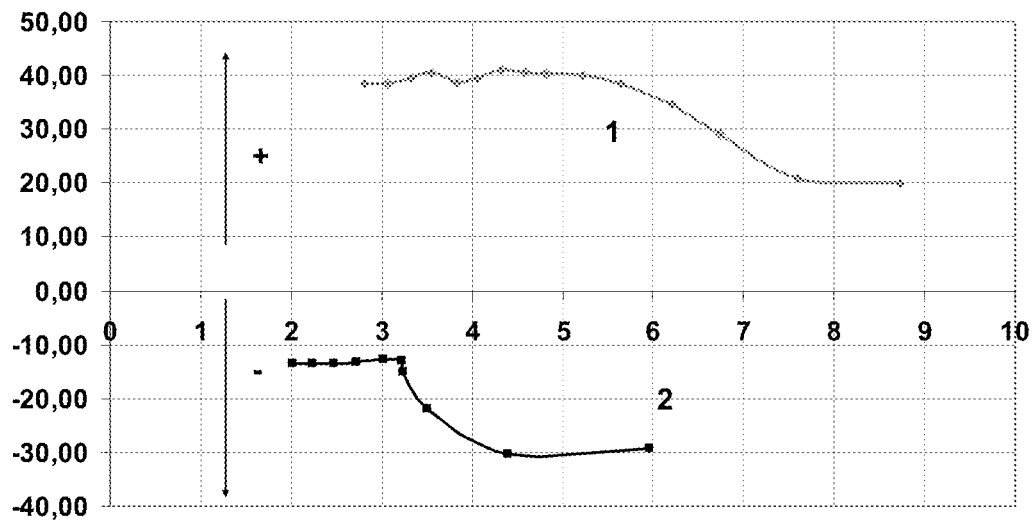
FIG. 19: Zeta potential (mV) versus pH of alumina coated silicon (different BET)(1) and comparison with pristine silicon (same initial BET)(2).

The high negative surface charge on nano-silicon powder can be clearly measured (see FIG. 19, line 2). The zeta potential is negative from pH 6 to 2. In the case of the alumina coated silicon, the powder has a positive zeta potential from at least pH 9 to at least pH 2.5. (FIG. 19, line 1)

The electrodes are prepared and tested as described in the Example 1. The result shows that the behaviour of the electrode is improved with the coating of alumina: after 100 cycles, the delivered capacity remains around 2500 mAh/g, versus 1000 mAh/g for the pristine silicon (see FIG. 7, line 2). It was found also that a coating that is thinner than 1 nm does not have the desired effect.

Example 8b: Alumina Coated Silicon: Variation of Specific Surface

In this Example 1, 5 g of a commercial micrometric powder (Aldrich), having a BET of 1 $m^2/g$ with a open porous volume lower than 0.001 cc/g (measurement done by ASAP equipment by isotherm adsorption-desorption of $N_2$ at 77K after preheated for 1 h under a flow of argon at 150° C.), an oxygen content <4 wt %, and an initial negative zetapotential (defined at pH7 in water) are use and treated as in Example 1.

Microscopic pictures show conformal homogeneous and thin (3 nm) coatings of alumina on the surface of the silicon particles. The measure of the zeta potential of the resulting material is made as in Example 8a. The negative surface charge on silicon powder can be clearly measured. The zeta potential is negative from pH 6 to 2. In the case of the alumina coated silicon, the powder has a positive zeta potential from at least pH 7 to at least pH 2.5.

Example 9: Alumina Coated Silicon Monoxide

In this Example, 5 g of a micrometric silicon monoxide powder, which consists of a mixture at nanometric scale of Si and $SiO_2$, and having a BET of 2 $m^2/g$, an oxygen content around 32 wt %, and an initial negative zetapotential (defined at pH7 in water) are used and treated as in Example 1.

Microscopic pictures show conformal homogeneous and thin (3 nm) coatings of alumina on the surface of the silicon particles. The BET surface of this powder and the oxygen content did not change during the ALD treatment. The measure of the zeta potential of the resulting material is made according to the following procedure: 150 ml of both a reference 2 wt % nano-silicon powder and the alumina coated silicon suspension in demineralised water is prepared by ultrasonification (120 s at 225 W). The zeta potential of this suspension in the aqueous medium is measured with the Zetaprobe Analyser™ from Colloidal Dynamics. The samples are automatically titrated from neutral pH to acid pH with 0.5 M HCl and to more basic pH with 0.5 M NaOH.

Figure 20:
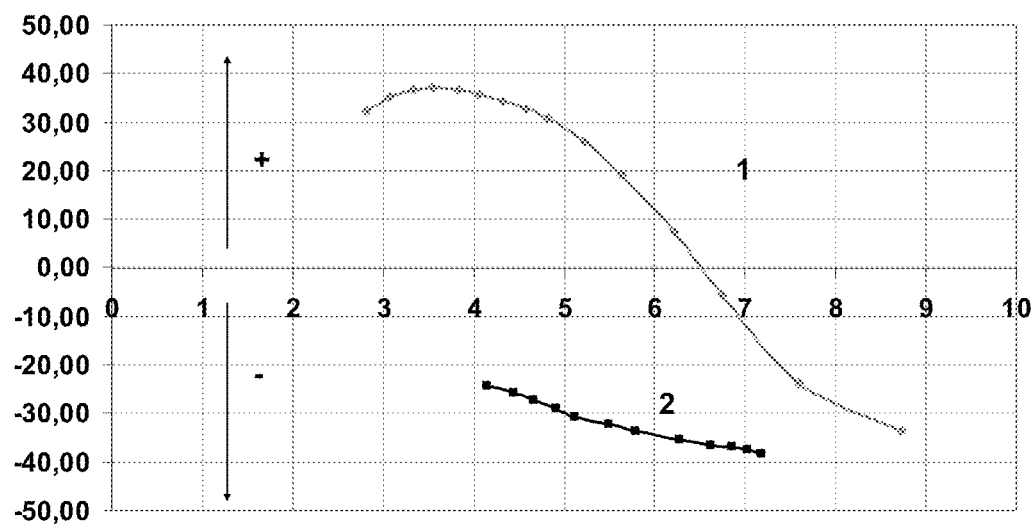
FIG. 20: Zeta potential (mV) versus pH of alumina coated silicon monoxide (1) and comparison with pristine silicon monoxide (2).

The high negative surface charge on micrometric silicon monoxide powder can be clearly measured (see FIG. 20, line 2). The zeta potential is negative from pH 7 to at least 4. In the case of the alumina coated silicon monoxide, the powder has a positive zeta potential from at least pH 3 to pH 6.8. (FIG. 20, line 1)

Example 10: Alumina and Carbon Coated Silicon

In this Example, 5 g of a carbon coated nanometric silicon powder, which consists of a silicon core made according to WO2012-000858 with a carbon coating made by CVD (chemical vapour deposition of toluene) technique, and having a BET of 20 m²/g, an oxygen content around 4 wt %, and an initial zetapotential (defined at pH7 in water) near to zero are used and treated as in Example 1. After the ALD treatment, the particles characteristics (alumina layer thickness and BET and oxygen content) are similar as the previous example. The increase of positive charge can be measured by zetapotential measurement (performed as in the previous Examples).

Example 11: Adsorption of Nanoparticles on Silicon Surface: Nanoparticles of In(OH)$_3$ 100 ml of a 1 wt % nano-silicon (made according to WO2012-000858) suspension in demineralised water is prepared by ultrasonification (120 s at 225 W). To this suspension, a known quantity of 1 wt % of In(OH)$_3$ nanoparticles (commercially available: particles size <30 nm) dispersed in water is added in order to have a In(OH)$_3$/Si ratio of at least 0.02. This combined dispersion is placed on a rollerbank for 30 minutes. Below this weight ratio indium hydroxide/silicon of 0.02, the agglomeration (silicon particles with adsorbed particles) charge stays negative; indeed a minimum quantity of particles is recommended to cover enough silicon surface and have a positive average charge of the agglomerations.

Example 12: Adsorption of Nanoparticles on Silicon Surface: Nanoparticles of Alumina Treated Silica 100 ml of a 1 wt % nano-silicon (made according to WO2012-000858) suspension in demineralised water is prepared by ultrasonification (120 s at 225 W). To this suspension, a known quantity of 2 wt % of alumina treated silica (Levasil 200 s) nano-particles (dispersed in water is added in order to have a treated SiO$_2$/Si ratio of at least 1.5. This combined dispersion is placed on a rollerbank for 30 minutes. Above this weight ratio treated SiO$_2$/silicon of 1.5, the agglomeration (silicon particles with adsorbed particles) charge stays negative; indeed a minimum quantity of particles is recommended to cover enough silicon surface and have a positive average charge of the agglomerations.

Slurries and batteries are prepared as in the Example 1, and the result is shown in the FIG. 15 (line 2). We clearly see that the behaviour of the electrode is improved with the adsorption of this type of nano-particles: after 100 cycles, the delivered capacity remains around 1600 mAh/g, versus 1000 mAh/g for the pristine silicon (FIG. 7 line 2).

Example 13: Adsorption of Nanoparticles on Silicon Surface: Nanoparticles of Iron Oxide 100 ml of a 1 wt % nano-silicon (made according to WO2012-000858) suspension in demineralised water is prepared by ultrasonification (120 s at 225 W). To this suspension, a known quantity of at least 2 wt % of iron oxide (commercially available, particles size 20.25 nm) nanoparticles dispersed in water is added in order to have a Fe$_2$O$_3$/Si ratio of at least 2. This combined dispersion is placed on a rollerbank for 30 minutes. Below this weight ratio iron oxide/silicon of 2, the agglomeration (silicon particles with adsorbed particles) charge stays negative; indeed a minimum quantity of particles is recommended to cover enough silicon surface and have a positive average charge of the agglomerations. The negative surface charge on nanometric silicon powder can be clearly measured. The zeta potential is negative from pH 4.5 to at least 9. In the case of the iron oxide coated silicon, the powder has a positive zeta potential from at least pH 2 to pH 8.

Slurries and batteries are prepared as in the Example 1. We clearly see that the behaviour of the electrode is improved with the adsorption of nanoparticles of iron oxide: after 100 cycles, the delivered capacity remains around 2000 mAh/g, versus 1000 mAh/g for the pristine silicon (FIG. 7 line 2). In parallel, we can also observe that the absorbed particles participate to the energy storage. Indeed, we know that the iron oxide nanoparticles can be reversibly reduced according to the conversion process.

Example 14: Adsorption of Nanoparticles on Silicon Surface: Nanoparticles of Magnesium Oxide 100 ml of a 1 wt % nano-silicon (made according to WO2012-000858) suspension in demineralised water is prepared by ultrasonification (120 s at 225 W). To this suspension, a known quantity of at least 2 wt % of magnesium oxide (commercially available) nano-particles (dispersed in water is added in order to have a MgO/Si ratio of at least 1. This combined dispersion is placed on a rollerbank for 30 minutes. Below this weight ratio MgO/silicon, the agglomeration (silicon particles with adsorbed particles) charge stays negative; indeed a minimum quantity of particles is recommended to cover enough silicon surface and have a positive average charge of the agglomerations. The negative surface charge on nanometric silicon powder can be clearly measured. The zeta potential is negative from at least pH 3.5 to at least 9. In the case of the iron oxide coated silicon, the powder has a positive zeta potential from at least pH 2 to at least pH 9.

The invention claimed is:
1. A negative electrode material for a lithium rechargeable battery, the material comprising a core comprising silicon, wherein the core has an average particle size between 20 nm and 200 nm, wherein the surface of the core is at least partly covered by a coating comprising inorganic nanoparticles, and wherein the material has a positive zeta potential in an interval between pH 3.5 and 9.5.

2. The negative electrode material of claim 1, wherein the inorganic nanoparticles comprise an aluminum compound, a zinc compound or an antimony compound.

3. The negative electrode material of claim 2, wherein the aluminum compound is either aluminum or $Al_2O_3$, the zinc compound is either zinc or zinc oxide, and the antimony compound is either antimony or antimony oxide.

4. The negative electrode material of claim 1, wherein the nanoparticles form a first coating layer on the core, the first coating layer having a thickness of less than 10 nm.

5. The negative electrode material of claim 4, wherein the particles further comprise a second coating layer located between the core and the nanoparticles, the second coating layer comprising either carbon or aluminum.

6. The negative electrode material of claim 5, wherein either one or both of the first and second coating layer is electrochemically active.

7. The negative electrode material of claim 4, wherein the first coating layer has a thickness between 1 and 5 nm.

8. The negative electrode material of claim 4, wherein the first coating layer is either conformal or porous.

9. The negative electrode material of claim 1, wherein the nanoparticles comprise a precursor material susceptible of being converted to aluminum, zinc or antimony by reduction.

10. The negative electrode material of claim 1, wherein the material has a positive zeta potential in an interval between pH 4 and 9.5.

11. The negative electrode material of claim 1, wherein the material has a point of zero-charge at pH 4 or higher.

12. The negative electrode material of claim 1, comprising either particles or a mixture of particles and wires.

13. The negative electrode material of claim 12, wherein both the particles and the wires are nano-sized, and wherein the average particle size of the particles is at least 5 times the average width of the wires.

14. The negative electrode material of claim 1, wherein the comprises either
   pure silicon; or
   a silicon monoxide powder, which comprises a mixture at nanometric scale of Si and $SiO_2$; or
   silicon having a $SiO_x$ surface layer, with $0<x<2$, the surface layer having an average thickness between 0.5 nm and 10 nm; or
   a homogeneous mixture of silicon- and metal-oxides, having the formula $SiO_x \cdot (M_aO_b)_y$, with $0<x<1$ and $0 \leq y<1$, wherein a and b are selected to provide electroneutrality, and wherein M is selected from the group consisting of Ca, Mg, Li, Al, and Zr; or
   an alloy Si—X, wherein X is either one or more metals selected from the group consisting of Sn, Ti, Fe, Ni, Cu, Co and Al.

15. The negative electrode material of claim 1, wherein the material has a BET value between 1 and 60 $m^2/g$.

16. A negative electrode material for a lithium rechargeable battery, the material comprising a core comprising silicon, wherein the surface of the core is at least partly covered by adsorbed cationic multivalent metal ions, and wherein the material has a positive zeta potential in an interval between pH 3.5 and 9.5.

17. The negative electrode material of claim 16, wherein the metal ions are selected from the group consisting of Al-, Sb-, Fe-, Ti- and Zn-ions and combinations thereof.

18. A negative electrode material for a lithium rechargeable battery, the material comprising a core comprising silicon, wherein the surface of the core is at least partly covered by silanol groups covalently bound to amino-functional metal compounds, wherein the metal compound is selected from the group consisting of Si, Al and Ti and combinations thereof, and wherein the material has a positive zeta potential in an interval between pH 3.5 and 9.5.

19. A negative electrode material for a lithium rechargeable battery, the material comprising a core comprising silicon, wherein the surface of the core is at least partly covered by adsorbed nanoparticles of cationic multivalent metal oxides, and wherein the material has a positive zeta potential in an interval between pH 3.5 and 9.5.

20. The negative electrode material of claim 19, wherein the metal oxides are selected from the group consisting of Al-oxide, Ca-oxide, Mg-oxide, Pb-oxide, Sb-oxide, Fe-oxide, Ti-oxide, Zn-oxide and In-hydroxide and combinations thereof.

* * * * *

UNITED STATES PATENT AND TRADEMARK OFFICE
CERTIFICATE OF CORRECTION

PATENT NO.         : 10,340,516 B2                                    Page 1 of 1
APPLICATION NO.    : 15/454142
DATED              : July 2, 2019
INVENTOR(S)        : Stijn Put et al.

It is certified that error appears in the above-identified patent and that said Letters Patent is hereby corrected as shown below:

In the Claims

Column 19, Line 2 of Claim 14, insert --core-- after "the" and before "comprises".

Signed and Sealed this
Twenty-seventh Day of August, 2019

Andrei Iancu
*Director of the United States Patent and Trademark Office*